(12) United States Patent
Suzuki

(10) Patent No.: US 7,222,795 B2
(45) Date of Patent: May 29, 2007

(54) LOADING DEVICE FOR STORAGE MEDIUM HAVING CONNECTION TERMINAL

(75) Inventor: Takeshi Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 221 days.

(21) Appl. No.: 10/511,757

(22) PCT Filed: Mar. 2, 2004

(86) PCT No.: PCT/JP2004/002559

§ 371 (c)(1),
(2), (4) Date: Oct. 19, 2004

(87) PCT Pub. No.: WO2004/079638

PCT Pub. Date: Sep. 16, 2004

(65) Prior Publication Data

US 2005/0173528 A1 Aug. 11, 2005

(30) Foreign Application Priority Data

Mar. 6, 2003 (JP) .......................... P2003-060053

(51) Int. Cl.
*G06K 13/04* (2006.01)
(52) U.S. Cl. ..................................................... 235/479
(58) Field of Classification Search ............... 235/479, 235/480, 481, 482, 483
See application file for complete search history.

(56) References Cited

U.S. PATENT DOCUMENTS 5,657,081 A * 8/1997 Kurahashi ................ 348/231.7
6,101,363 A * 8/2000 Tomatsu ..................... 399/330
6,691,920 B1 * 2/2004 Kawamura et al. ......... 235/492

FOREIGN PATENT DOCUMENTS

| JP | 8-272912 | 10/1996 |
| JP | 9-259495 | 10/1997 |
| JP | 2000-100042 | 4/2000 |

* cited by examiner

*Primary Examiner*—Daniel Stcyr
(74) *Attorney, Agent, or Firm*—Oblon, Spivak, McClelland, Maier & Neustadt, P.C.

(57) ABSTRACT

A loading apparatus with which it is possible to securely connect connection terminals of a recording medium to terminal electrodes, thereby enhancing the reliability of operations of the loading apparatus. A holder (34) which holds a recording medium (100) having connection terminals (105) and which is moved between an insertion/take-out position where the recording medium is inserted or taken out and a completion position where the loading of the recording medium is completed, and a lock lever (42) for locking the holder in the insertion/take-out position, are provided, and the locking of the holder in the insertion/take-out position by the lock lever is released when the connection terminals of the recording medium are connected to the terminal electrodes.

9 Claims, 32 Drawing Sheets

LOADING DEVICE FOR STORAGE MEDIUM HAVING CONNECTION TERMINAL

TECHNICAL FIELD

The present invention relates to a loading apparatus for a recording medium having connection terminals. More particularly, the invention relates to a technical field for starting loading in the condition where connection terminals of a recording medium and terminal electrodes are connected to each other, and securely connecting the connection terminals to the terminal electrodes.

BACKGROUND ART

There has been known a loading apparatus for loading a recording medium on which to record information signals, for example, a plate-like recording medium including a semiconductor memory and a plurality of connection terminals. Such loading apparatuses are provided in various electronic apparatuses such as, for example, various audio apparatuses, personal computers, cellular phones, etc.

Among the loading apparatuses, there is one which includes a holder for holding the recording medium, and a chassis for supporting the holder movably in the moving direction of the holder, and in which a plurality of terminal electrodes for connection with connection terminals of the recording medium are attached to the chassis (see, for example, Japanese Patent Laid-open No. 2001-60253).

In the conventional loading apparatus, the holder can be moved between a first position for insertion and removal of the recording medium and a second position where the connection terminals of the recording medium are connected to the terminal electrodes. When the recording medium is inserted into and held in the holder located in the first position, the holder and the recording medium are moved as one body to the second position by a biasing force of a bias member (toggle spring), and the connection terminals are connected to the terminal electrodes, whereby the loading of the recording medium is completed.

In the above-mentioned conventional loading apparatus, however, the terminal electrodes are attached to the chassis, and the connection terminals of the recording medium held by the holder are connected to the terminal electrodes attached to the chassis, so that the positional accuracy of attachment of the terminal electrodes to the chassis, the positional accuracy of the holder relative to the chassis and the positional accuracy of insertion of the recording medium into the holder have influences on the conditions of connection of the connection terminals and the terminal electrodes. Namely, where these good positional accuracies are not secured, defects might be generated in the connection between the connection terminals of the recording medium and the terminal electrodes.

In addition, since the holder is moved relative to the chassis and the connection terminals of the recording medium held in the holder are thereby connected to the terminal electrodes, a good condition of connection between the connection terminals of the recording medium and the terminal electrodes may not be secured, in the case where, for example, the holder stops on the upstream side of the second position due to deterioration of the toggle spring, the case where the condition of insertion of the recording medium into the holder is imperfect, or the like cases.

Accordingly, a loading apparatus for a recording medium having connection terminals according to the present invention aims at securely connecting the connection terminals of the recording medium to the terminal electrodes and contriving an enhancement of the reliability of the operations of the loading apparatus.

DISCLOSURE OF INVENTION

In order to attain the above aim, according to the present invention, there is provided a loading apparatus for a recording medium having connection terminals, including: a holder which holds the recording medium having the connection terminals and which is moved between an insertion/take-out position where the recording medium is inserted or taken out and a completion position where the loading of the recording medium is completed; a chassis for supporting the holder movably between the insertion/take-out position and the completion position; terminal electrodes which are mounted to the holder and to which the connection terminals of the recording medium are connected; and a lock lever for locking the holder in the insertion/take-out position, wherein the locking of the holder in the insertion/take-out position by the lock lever is released when the connection terminals of the recording medium are connected to the terminal electrodes.

Therefore, in the loading apparatus for a recording medium having connection terminals according to the present invention, the movement of the holder from the insertion/take-out position to the completion position is started in the condition where the connection terminals of the recording medium are connected to the terminal electrodes.

BEST MODE FOR CARRYING OUT THE INVENTION

Now, an embodiment of the loading apparatus for a recording medium having connection terminals according to the present invention will be described below, referring to the accompanying drawings.

Figure 1:
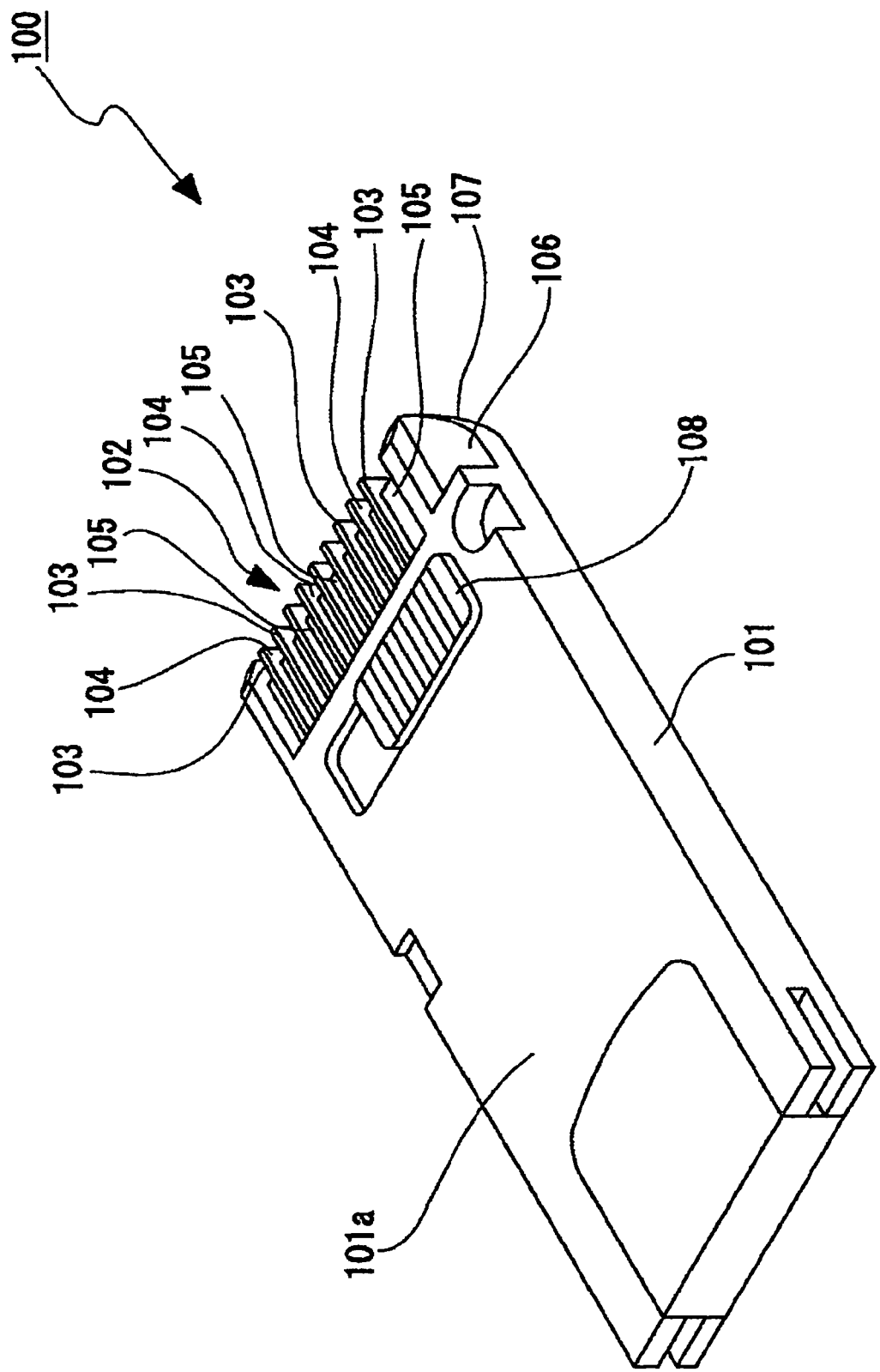
FIG. 1, together with FIGS. 2 and 3, illustrates a recording medium mounted to a loading apparatus, and is an enlarged perspective view.

First, a plate-like recording medium which is mounted on a loading apparatus and on which data is written and/or read will be described (see FIGS. 1 to 3).

The recording medium 100 is formed in a flat roughly rectangular shape elongate in one direction (see FIG. 1), in which a semiconductor memory such as a flash memory is incorporated in a casing 101. The casing 101 has a first principal surface 101a having the maximum area and a second principal surface (not shown) which is a surface on the opposite side of the first principal surface 101a.

A connection portion 102 is provided at one end portion in the longitudinal direction (front-rear direction) of the first principal surface 101a. At the connection portion 102, ten connection recessed portions 104, 104, . . . are formed by a plurality of partition walls 103, 103, . . . provided at regular intervals along the crosswise direction (left-right direction) of the first principal surface 101a. The connection recessed portions 104, 104, . . . are opened on one side in the longitudinal direction of the first principal surface 101a and on one side in the thickness direction of the recording medium 100, and connection terminals 105, 105, . . . are arranged respectively in the connection recessed portions 104, 104, . . . .

Of the recording medium 100, the portion adjacent to the connection portion 102 is provided as a cutout portion 106 opened in the thickness direction of the casing 101, and the outer edge of the cutout portion 106 is formed as a bevel portion 107 having a roughly arcuate shape.

A misrecording preventive knob 108 is slidably provided in the vicinity of the connection portion 102, on the first principal surface 101a. The misrecording preventive knob 108 has the function of enabling writing of data into the semiconductor memory when it is in the state of having been slid to one side, and of disabling the writing of data into the semiconductor memory when it is in the state of having been slid to the other side.

Figure 2:
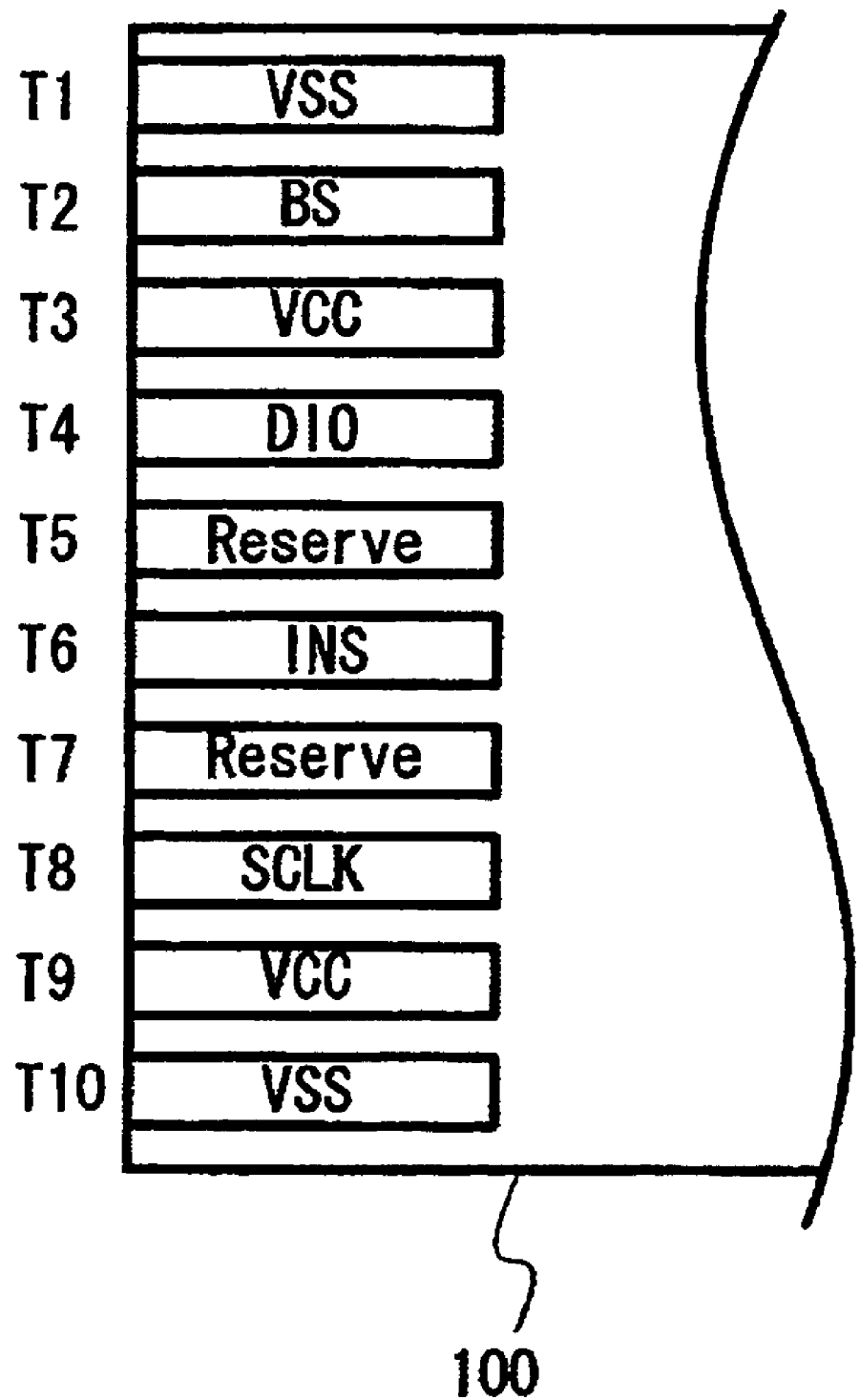
FIG. 2 is a conceptual diagram showing the electrode structure of connection terminals.
Figure 3:
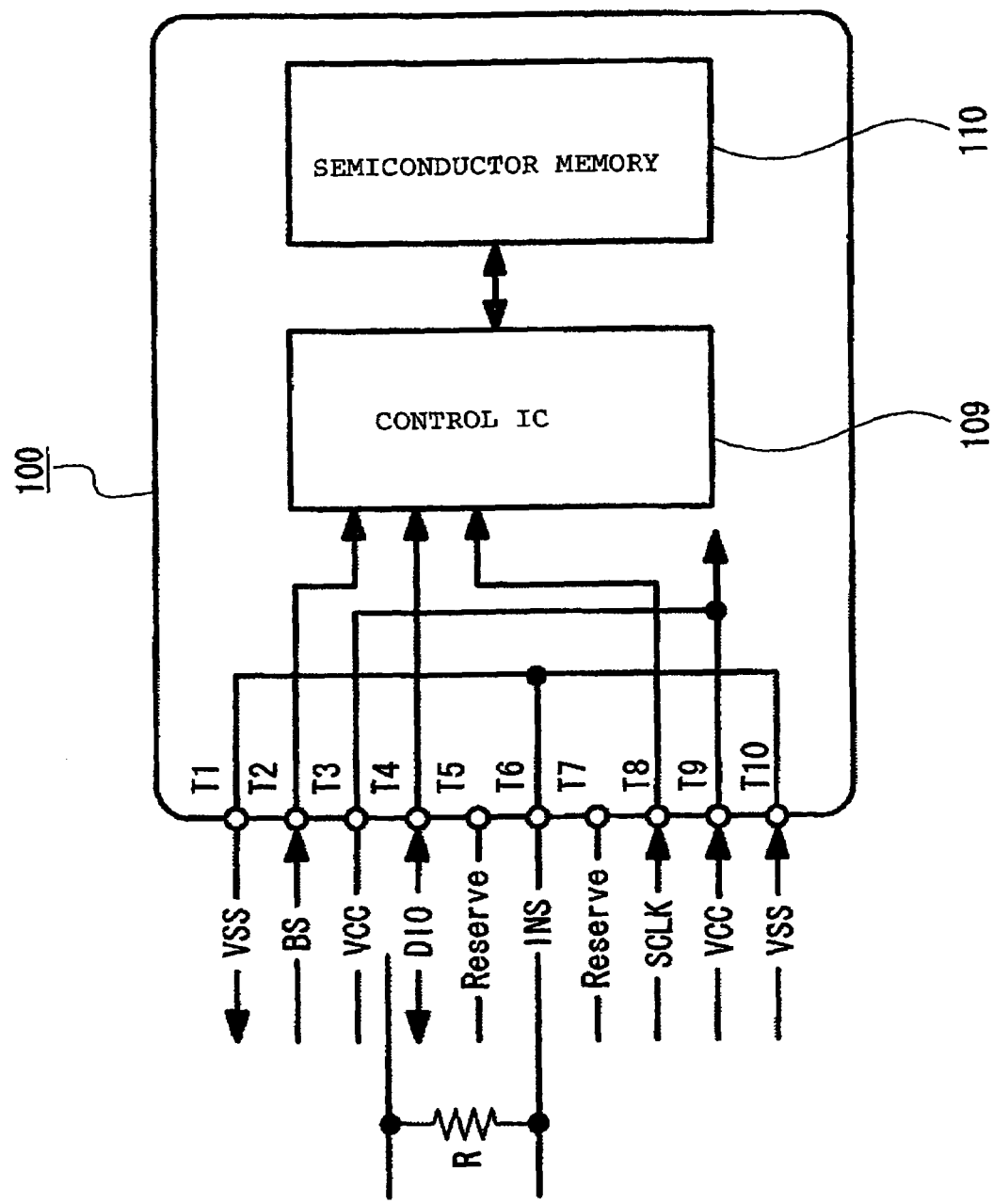
FIG. 3 is a conceptual diagram showing an inside structure and the electrode structure of the connection terminals.

The connection terminals 105, 105, . . . are constituted of ten flat terminal electrodes (terminals T1 to T10) (see FIG. 2).

Terminal T1 and terminal T10 are detection voltage VSS terminals. Terminal T2 is an input terminal for a serial protocol bus state signal BS. Terminal T3 and terminal T9 are source voltage VCC terminals. Terminal T4 is an input/output terminal for a serial protocol data signal. Terminal T5 and terminal T7 are reserve terminals. Terminal T6 is a detection terminal for detection of the recording medium 100. Terminal T8 is an input terminal for a serial clock SCLK.

Next, the relationship between terminals T1 to T10 and the inside structure of the recording medium 100 will be described (see FIG. 3).

A control IC 109 and a semiconductor memory 110 are arranged in the inside of the casing 101.

The control IC 109 has the function of writing and reading data into and from the semiconductor memory 110. The control IC 109 is connected to terminal T2, terminal T4 and terminal T8, the serial protocol bus state signal BS is inputted through terminal T2, and the serial clock SCLK is inputted through terminal T8.

At the time of a writing operation, data inputted through terminal T4 is written into the semiconductor memory 110, based on the serial protocol bus state signal BS inputted through terminal T2 and the serial clock SCLK inputted through terminal T8.

At the time of a reading operation, data is read out of the semiconductor memory 110, based on the serial protocol bus state signal BS and the serial clock SCLK, and the data thus read is outputted through terminal T4.

The detection voltage VSS is inputted to terminal T6, the voltage on terminal T6 is detected by a resistor R, and it is thereby detected whether or not the connection terminals 105, 105, . . . of the recording medium 100 are connected to terminal electrodes of the loading apparatus.

Next, the loading apparatus 1 for loading the recording medium 100 will be described (see FIGS. 4 to 15). The loading apparatus 1 is provided in each of various electronic apparatus such as various audio apparatuses, personal computers, cellular phones, etc. In such an electronic apparatus, various kinds of data such as, for example, motion picture data, still picture data, voice data, HiFi data (music data), computer data, control data, etc. are written into or read from the recording medium 100 loaded.

The loading apparatus 1 is disposed in a housing of the electronic apparatus, and the housing is provided with a slot for inserting the recording medium 100 into the loading apparatus 1 or taking out the recording medium 100 from the loading apparatus 1.

Figure 4:
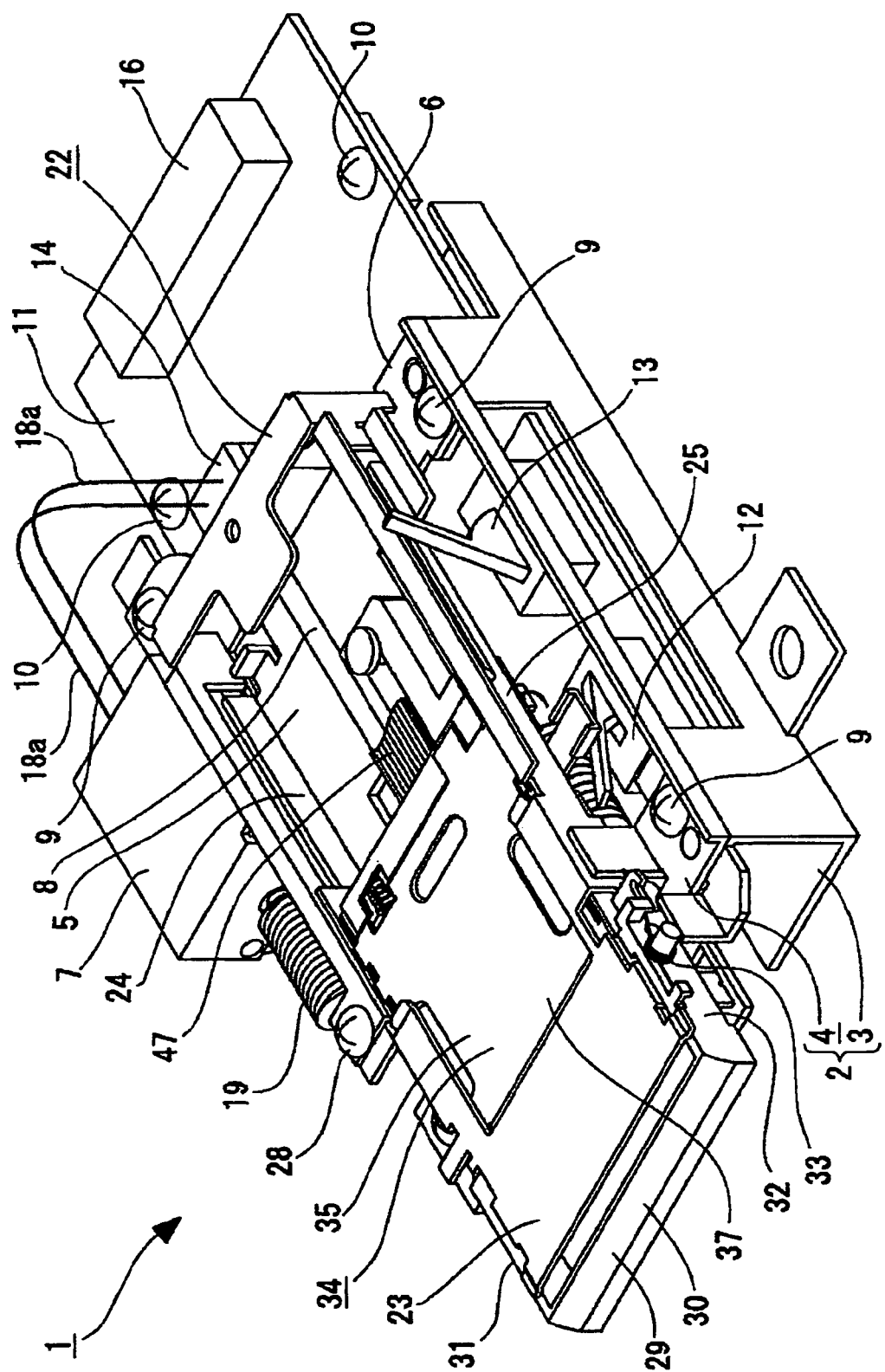
FIG. 4, together with FIGS. 5 to 33, illustrates the loading apparatus, and is an enlarged perspective view of the loading apparatus.
Figure 5:
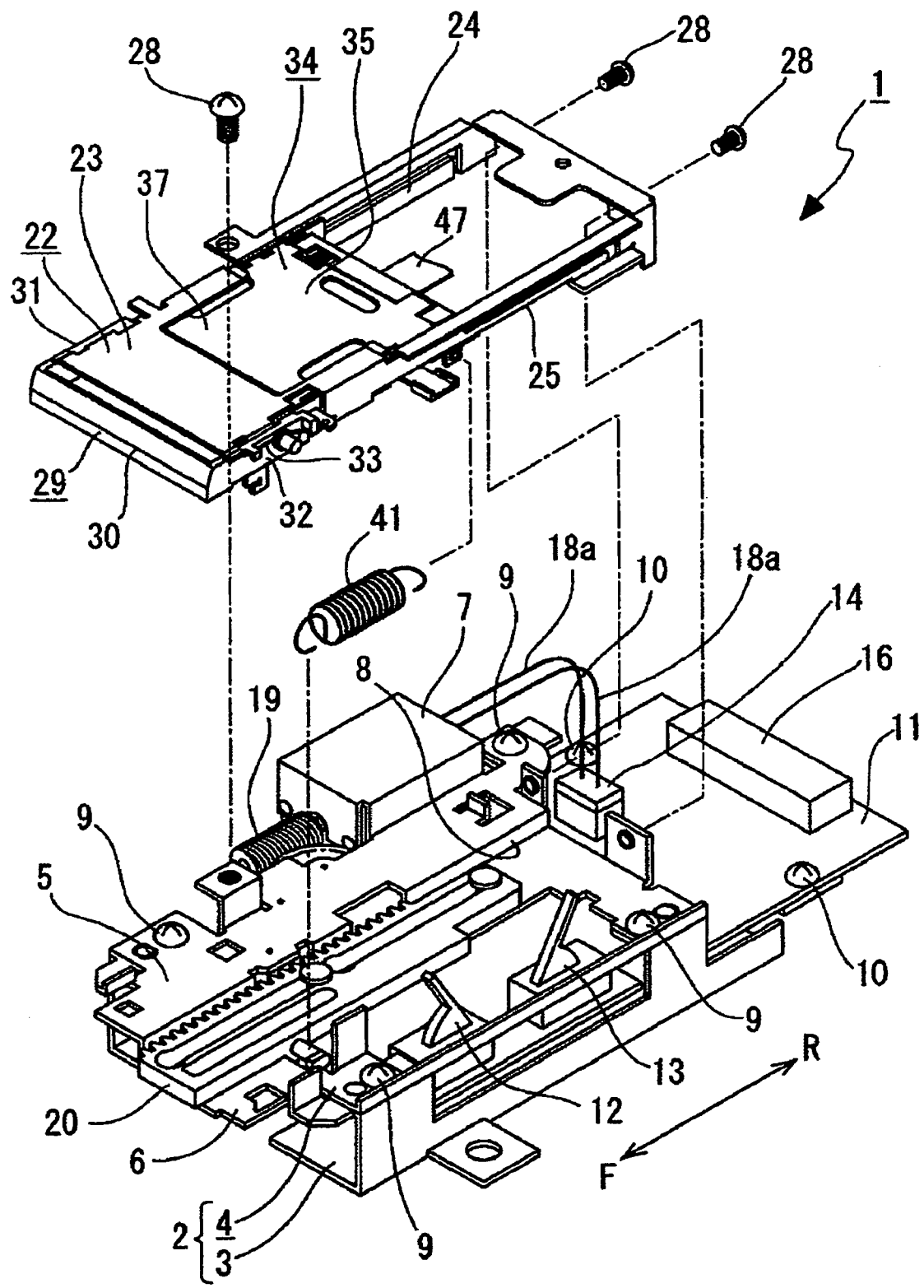
FIG. 5 is a perspective view showing the loading apparatus by separating a part thereof.
Figure 6:
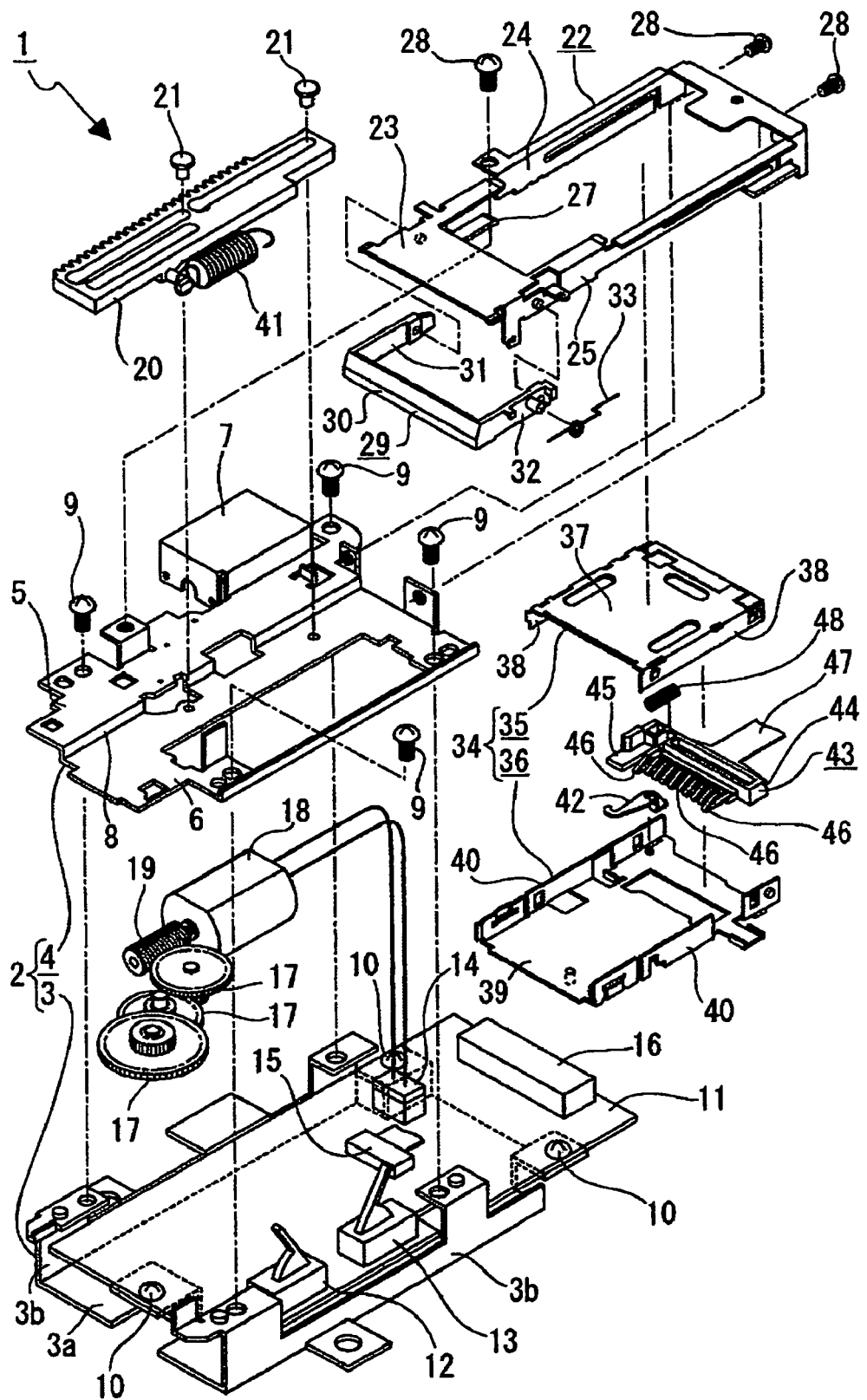
FIG. 6 is an exploded perspective view of the loading apparatus.

The loading apparatus 1 includes desired component parts arranged on a base body 2 (see FIGS. 4 to 6). The base body 2 is composed of a mount base 3 and an arrangement base 4 coupled to each other.

Figure 7:
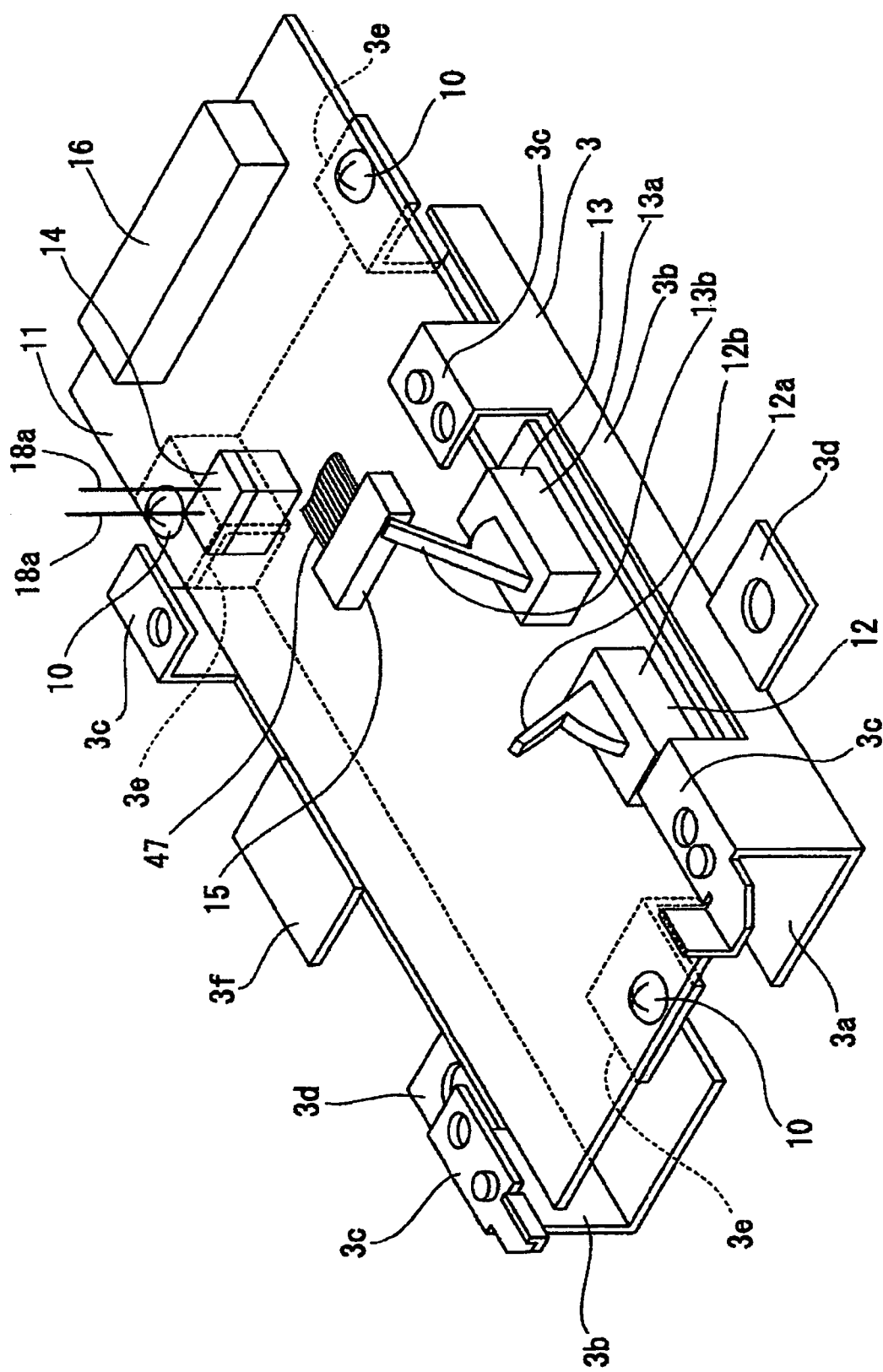
FIG. 7 is an enlarged perspective view showing a mount base of a base body and a circuit substrate attached thereto.

As shown in FIG. 7, the mount base 3 has a bottom plate portion 3a having an elongate roughly rectangular shape, and side plate portions 3b, 3b projected upwards respectively from both left and right side edges of the bottom plate portion 3a. The side plate portions 3b, 3b are provided at their upper edges with connection surface portions 3c, 3c, . . . formed by bending to the inside, and the side plate portions 3b, 3b are provided at their lower edges with mounted surface portions 3d, 3d formed by bending to the outside. The mounted surface portions 3d, 3d are attached to predetermined positions of the inside of the electronic apparatus by screwing.

The mount base 3 is provided with substrate mount portions 3e, 3e, 3e formed by bending from predetermined positions, and the substrate mount portions 3e, 3e, 3e are located between the bottom plate portion 3a and the connection surface portions 3c, 3c, . . . .

The side plate portion 3b on one side is provided with a motor receiving portion 3f formed by bending to the outside.

Figure 8:
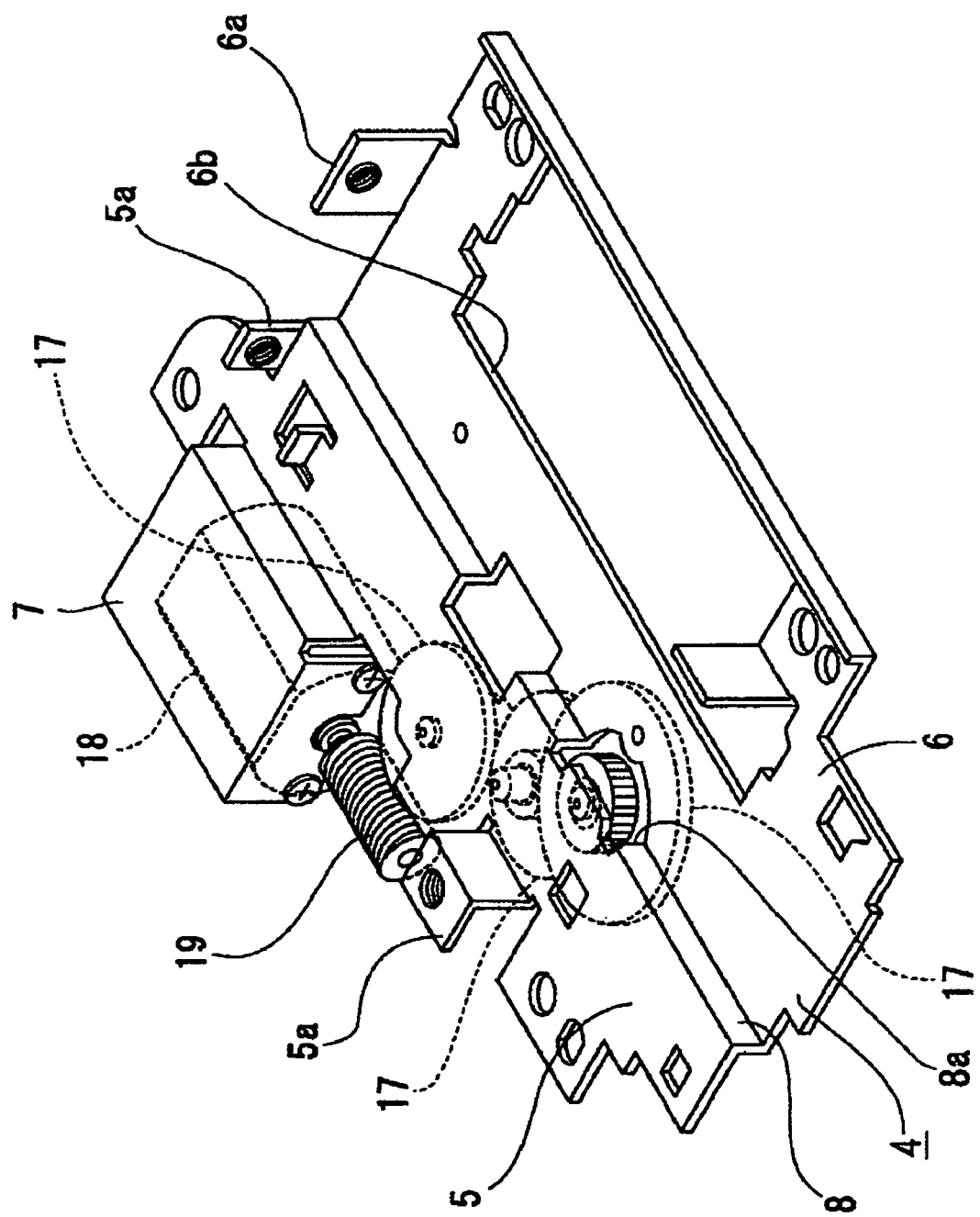
FIG. 8 is an enlarged perspective view showing an arrangement base of the base body and a drive motor and a transmission gear arranged on the arrangement base.
Figure 9:
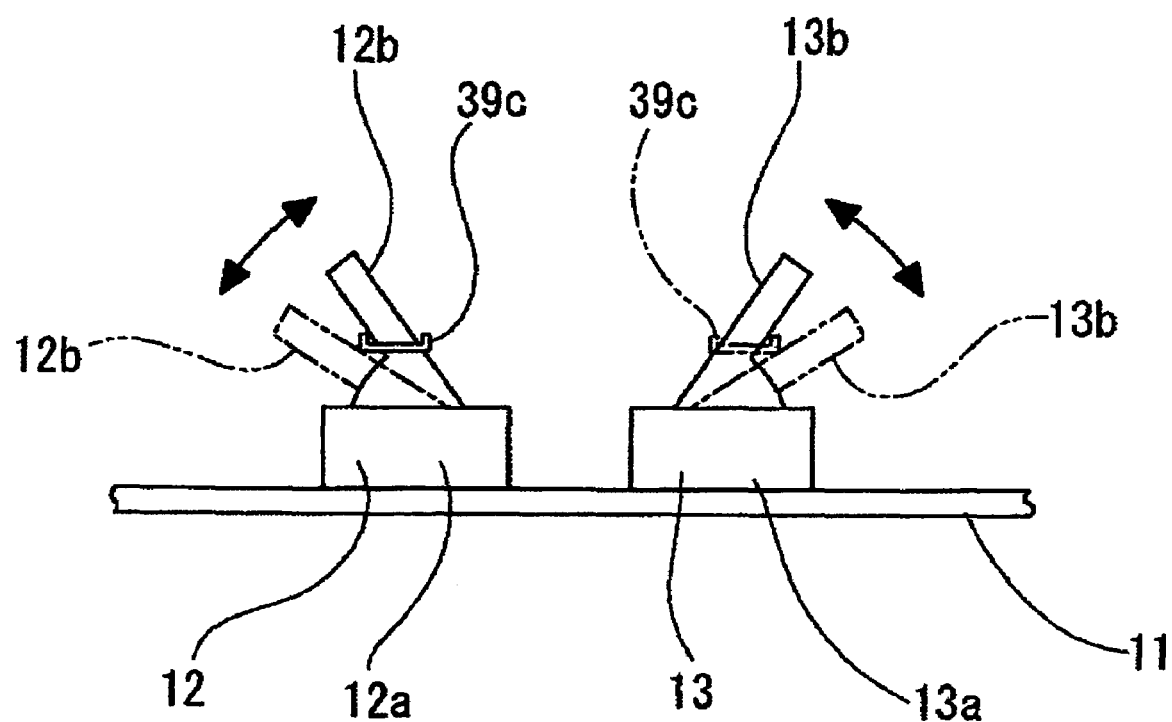
FIG. 9 is an enlarged side view showing the position of a changeover switch.

As shown in FIG. 8, the arrangement base 4 has a first flat plate portion 5, a second flat plate portion 6 and a motor mount portion 7, and the first flat plate portion 5 and the second flat plate portion 6 located on the left and right sides are connected with each other through a step portion 8.

The first flat plate portion 5 is located slightly higher than the second flat plate portion 6, and chassis attachment pieces 5a, 5a having screw holes are provided at predetermined positions of the first flat plate portion 5. A chassis attachment piece 6a having a screw hole is provided at a predetermined position of the second flat plate portion 6. The second flat plate portion 6 is provided with an arrangement hole 6b elongate in the front-rear direction. A motor mount portion 7 is provided in continuity with the first flat plate portion 5. The step portion 8 is provided with a gear arrangement hole 8a.

Of the arrangement base 4, predetermined portions are attached respectively to the connection surface portions 3c, 3c, . . . by attachment screws 9, 9, . . . (see FIGS. 4 and 6).

A circuit substrate 11 is mounted to the substrate mount portions 3e, 3e, 3e of the mount base 3 by screw members 10, 10, 10 (see FIGS. 4 to 7).

Changeover switches 12, 13 are mounted on a side edge on one side of the circuit substrate 11 (see FIGS. 4 to 6). The changeover switches 12, 13 are composed respectively of switch cases 12a, 13a and operated pieces 12b, 13b, and are turned ON or OFF when the operated pieces 12b, 13b are operated. The changeover switches 12, 13 have the operated pieces 12b, 13b projected upwards through the arrangement hole 6b of the arrangement base 4.

The operated pieces 12b, 13b of the changeover switches 12, 13 are respectively turned relative to the switch cases 12a, 13a so that they come to operation positions in which they are turned down flat (the positions indicated by chain lines in FIG. 9) in the condition where they are operated by operating projected portions of a holder described later and that they return to non-operation positions (the positions indicated by solid lines in FIG. 9) in the condition where the operation is released.

As shown in FIG. 7, a motor connector 14, a wiring board connector 15 and an external connection connector 16 are mounted on the circuit substrate 11, at individual positions. The external connection connector 16 is connected to a drive circuit (not shown) of the electronic apparatus through a connection plate, for supply of power source, transfer of signals, and the like.

Transmission gears 17, 17, 17 are supported on the first flat plate portion 5 of the arrangement base 4 (see FIGS. 6 and 8). The transmission gears 17, 17, 17 are stepped gears, and are arranged on the bottom surface side of the arrangement base 4 in the state of being mutually meshed. Of the transmission gears 17, 17, 17, the transmission gear 17 in the frontmost row has a part thereof projected to the side of the second flat plate portion 6 via the gear arrangement hole 8a in the step portion 8 (see FIG. 8).

A drive motor 18 is mounted to the motor mount portion 7 of the arrangement base 4 by screwing, and the drive motor 18 is received by the motor receiving portion 3f of the mount base 3. A worm 19 is fixed to a motor shaft of the drive motor 18, and the worm 19 is meshed with the transmission gear 17 in the rearmost row. The drive motor 18 is connected through connection cables 18a, 18a to the motor connector 14 mounted on the circuit substrate 11 (see FIGS. 4 to 6).

A conveying rack 20 is supported on the second flat plate portion 6 of the arrangement base 4, so as to be movable in the front-rear direction (the F-R direction shown in FIG. 5).

Figure 10:
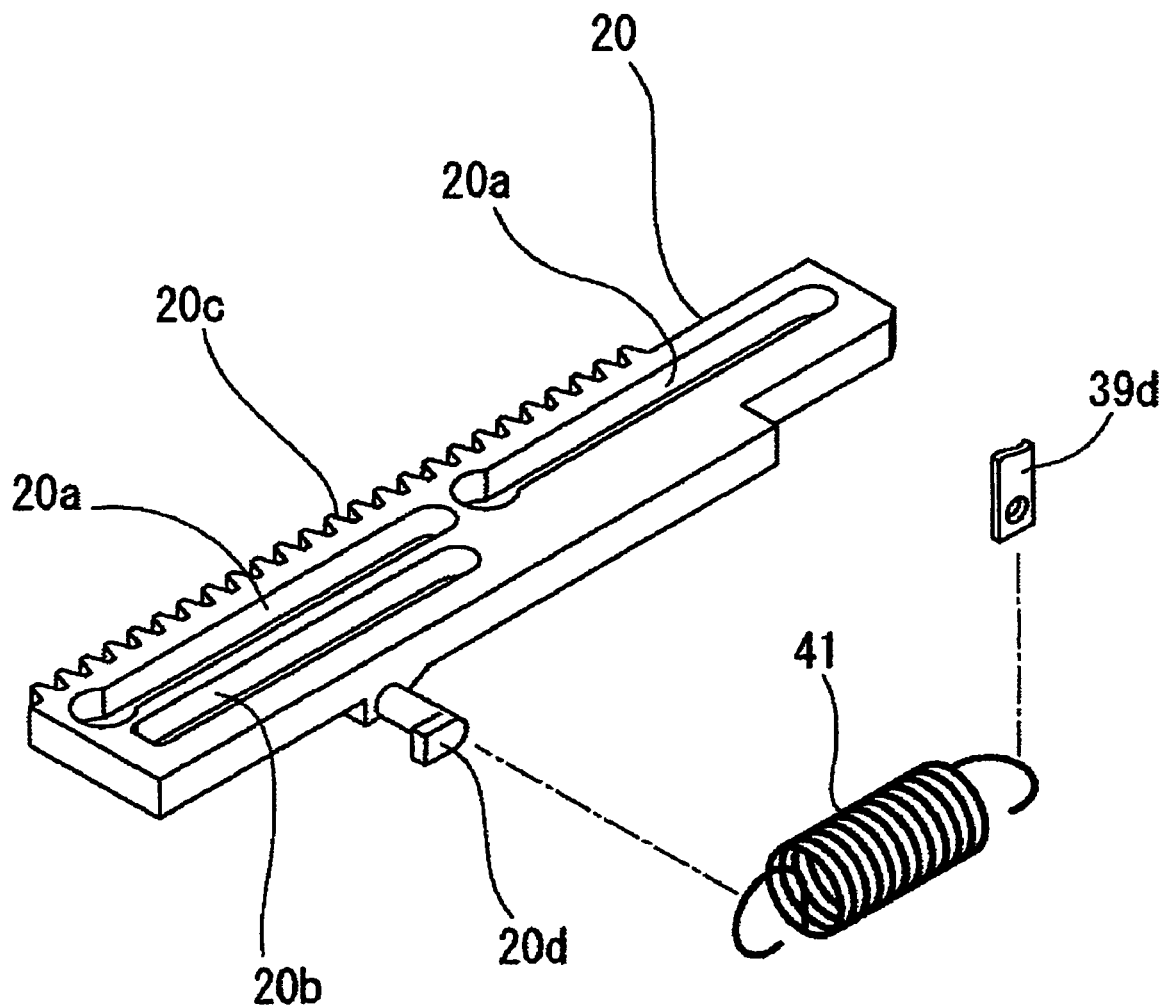
FIG. 10 is an enlarged exploded perspective view showing a conveying rack and a limiter spring.

As shown in FIG. 10, the conveying rack 20 is formed to be elongate in the front-rear direction, and is provided with guided holes 20a, 20a being elongate in the front-rear direction and spaced from each other in the front-rear direction and with an insertion hole 20b being elongate in the front-rear direction and being located on a lateral side of the guided hole 20a on the front side. The conveying rack 20 is provided with a rack portion 20c along a side edge on one side thereof, and a spring hook projected portion 20d is projected sideways from a side edge on the other side of the conveying rack 20.

As shown in FIG. 6, the conveying rack 20 is supported on the arrangement base 4 so as to be movable in the front-rear direction, in the condition where guide pins 21, 21 attached to the arrangement base 4 are inserted respectively in the guided holes 20a, 20a. In the condition where the conveying rack 20 is supported on the arrangement base 4, the rack portion 20c is meshed with the transmission gear 17 projected via the gear arrangement hole 8a in the step portion 8, and the spring hook projected portion 20d is arranged in the arrangement hole 6b in the arrangement base 4. Therefore, when the drive motor 18 is rotated, the drive force is transmitted through the transmission gears 17, 17, 17 to the conveying rack 20, whereby the conveying rack 20 is moved in a direction according to the rotating direction of the drive motor 18, i.e., forwards (in the F direction shown in FIG. 5) or rearwards (in the R direction shown in FIG. 5).

Figure 11:
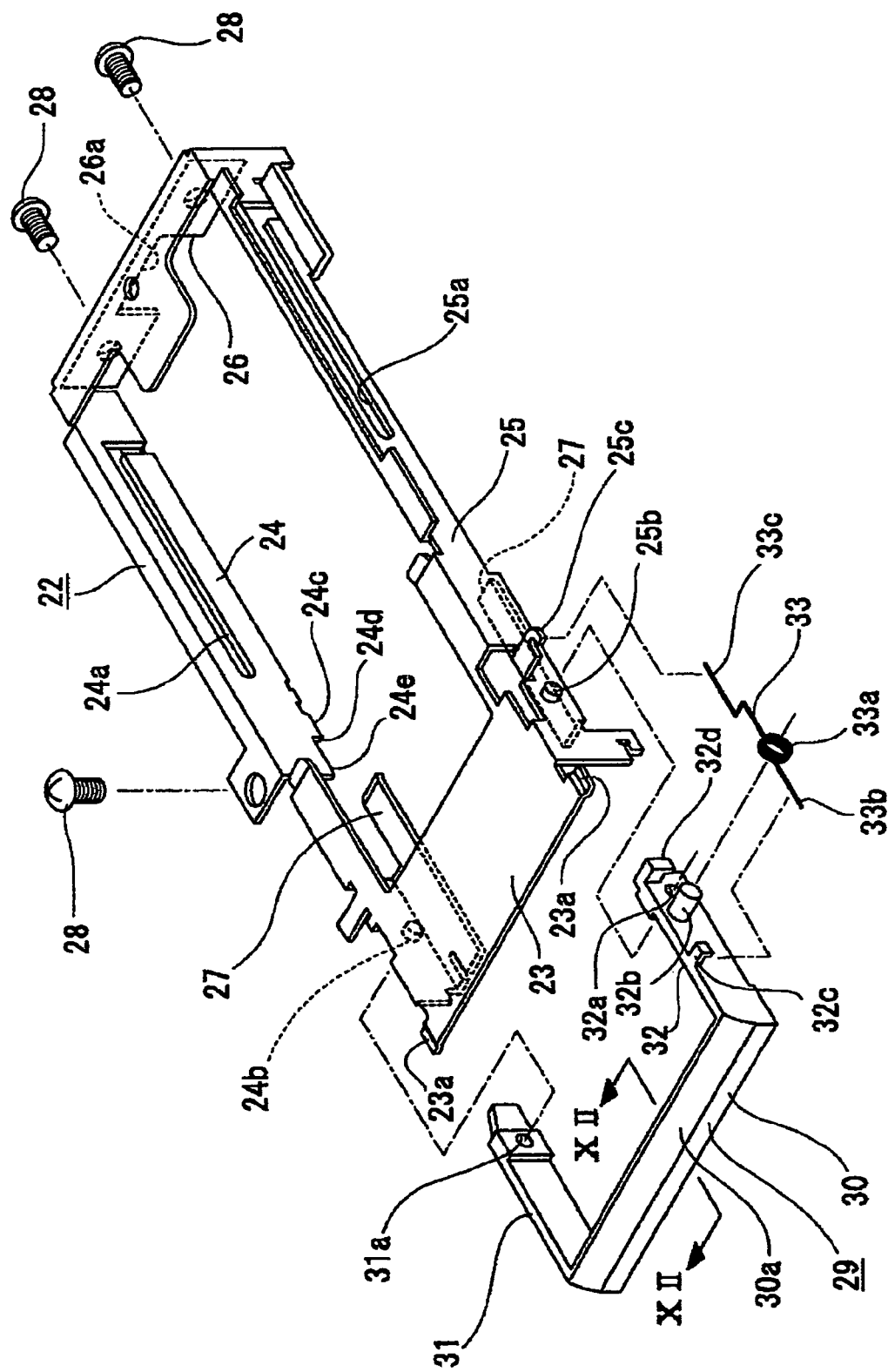
FIG. 11 is an enlarged exploded perspective view showing a chassis and a shutter supported thereon.

A chassis 22 is attached to the chassis attachment pieces 5a, 5a, 6a of the mount base 3 (see FIGS. 4 to 6). As shown in FIG. 11, the chassis 22 is composed of a top plate portion 23, side plate portions 24, 25, a rear plate portion 26 and plate receiving portions 27, 27 which are formed integral with each other.

The top plate portion 23 is provided at its front end portions with stopper pieces 23a, 23a projected to lateral sides, respectively. The top plate portion 23 is provided with an attached piece 23b projected sideways.

The side plate portions 24, 25 are provided respectively with guide holes 24a, 25a elongate in the front-rear direction. Support pins 24b, 25b are provided at positions near the front ends of the side plate portions 24, 25. The side plate portion 24 is provided, at a roughly central portion in the longitudinal direction thereof, with a projected portion 24c projected downwards, and the front edge of the projected portion 24c is formed as a restricted portion 24d. A space on the front side of the restricted portion 24d is formed as a lever passing cutout 24e. A spring hook projected portion 25c projected sideways is provided at a position immediately on the rear side of the support pin 25b of the side plate portion 25.

The rear plate portion 26 is provided with an arrangement cutout 26a opened downwards.

The plate receiving portions 27, 27 are projected respectively from the lower edges of the side plate portions 24, 25 in such directions as to approach each other, and are located on the front end side of the side plate portions 24, 25.

The chassis 22 has its attached piece 23b and rear plate portion 26 attached to the chassis attachment pieces 5a, 5a, 6a of the mount base 3 by set screws 28, 28, 28 (see FIG. 6).

A shutter 29 is turnably supported on a front end portion of the chassis 22 (see FIG. 11). The shutter 29 includes an opening/closing portion 30 elongate in the left-right direction and arm portions 31, 32 projected rearwards respectively from both left and right end portions of the opening/closing portion 30, which are formed integral with each other.

Figure 12:
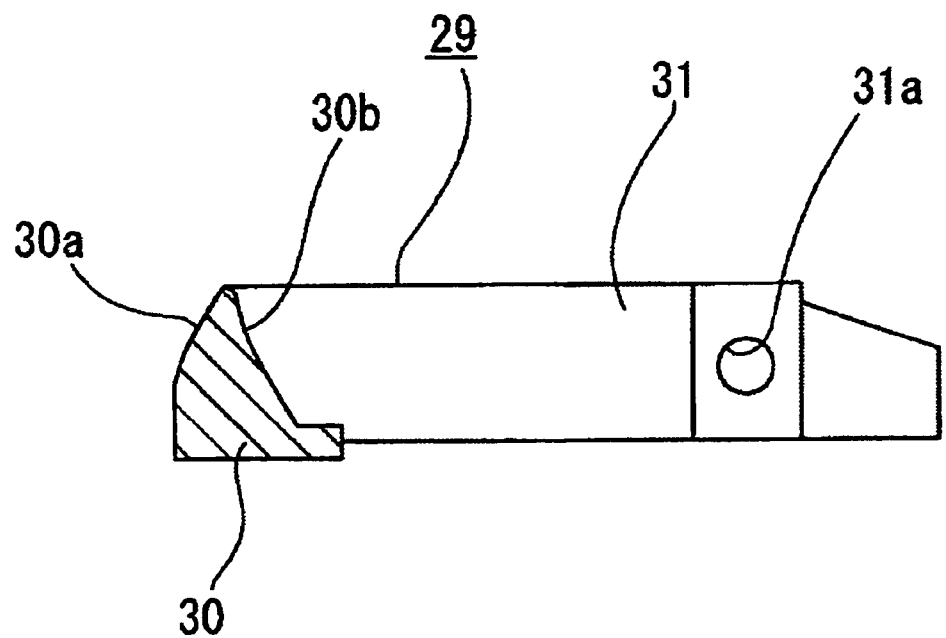
FIG. 12 is an enlarged sectional view along line XII—XII of FIG. 11.

As shown in FIG. 12, the opening/closing portion 30 is provided with a first guide surface 30a at its front surface and with a second guide surface 30b at its rear surface. The first guide surface 30a is inclined so as to be displaced rearwards. As one goes upwards, and the second guide surface 30b is inclined so as to be displaced forwards as one goes upwards.

The arms 31, 32 are provided respectively with supported holes 31a, 32a in their tip end portions.

The arm portion 32 is provided on its outside surface with a spring support shaft 32b projected sideways. The arm portion 32 is provided with a spring hook piece 32c at a position on the front side of the spring support shaft 32b, and is provided with a drop-off preventive piece 32d at a position on the rear side of the spring support shaft 32b. The spring hook piece 32c and the drop-off preventive piece 32d are each formed in a fell-down L shape.

Figure 13:
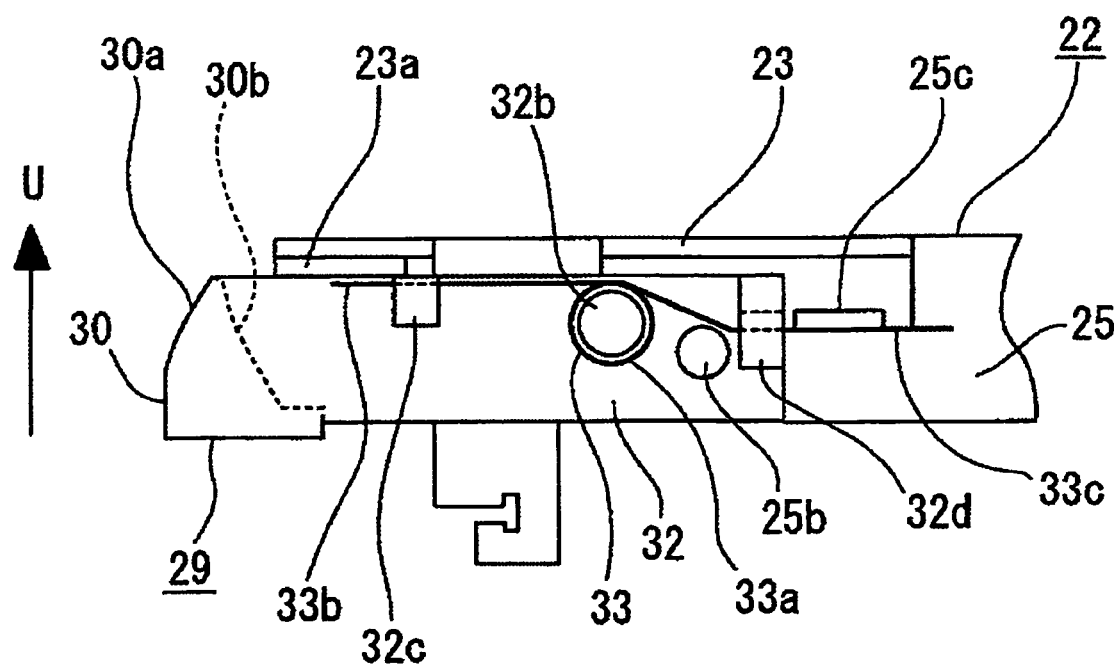
FIG. 13 is an enlarged side view showing the condition where the shutter is supported on the chassis.

The shutter 29 is turnably supported on the chassis 22 by inserting the support pins 24b, 25b of the chassis 22 in the supported holes 31a, 32a. In the condition where the shutter 29 is supported on the chassis 22, as shown in FIG. 13, a coil portion 33a of a torsion coil spring 33 is supported on the spring support shaft 32b of the shutter 29, one end portion 33b of the torsion coil spring 33 is supported on the spring hook piece 32c of the shutter 29, and the other end portion 33c of the torsion coil spring 33 is passed through the drop-off preventive piece 32d and supported on the spring hook projected piece 25c of the chassis 22. Therefore, the shutter 29 is biased by the torsion coil spring 33 in such a direction that the opening/closing portion 30 is moved roughly upwards (in the U direction shown in FIG. 13), and, in the condition where the top surfaces of the arm portions 31, 32 make contact with the stopper pieces 23a, 23a of the chassis 22, a front opening of the chassis 22 is closed with the opening/closing portion 30 of the shutter 29.

A holder 34 is supported on the chassis 22 movably in the front-rear direction (the F-R direction shown in FIG. 5) (see FIGS. 4 and 5). The holder 34 has a structure in which an upper shell 35 and a lower shell 36, both formed of metallic materials, are coupled in an upper-lower relationship (see FIG. 14).

The upper shell 35 includes an upper surface 37 and side surfaces 38, 38 continuous respectively with both left and right side edges of the upper surface 37, which are formed integral with each other.

The upper surface 37 is provided with holding portions 37a, 37a, 37b. The holding portions 37a, 37a, 37b are formed in projected shapes by embossing parts of the upper surface 37 downwards, the holding portions 37a, 37a are spaced from each other to the left and right sides and formed elongate in the front-rear direction, and the holding portion 37b is located near the rear end of the upper surface 37 and formed elongate in the left-right direction.

The side surfaces 38, 38 are provided with engagement pieces 38a, 38a, . . . spaced from each other in the front-rear direction, respectively. The engagement pieces 38a, 38a, . . . are formed as leaf springs by cutting and raising parts of the side surfaces 38, 38, only their lower edges are continuous with the side surfaces 38, 38, and their upper edges are located on the outside relative to their lower edges.

Figure 14:
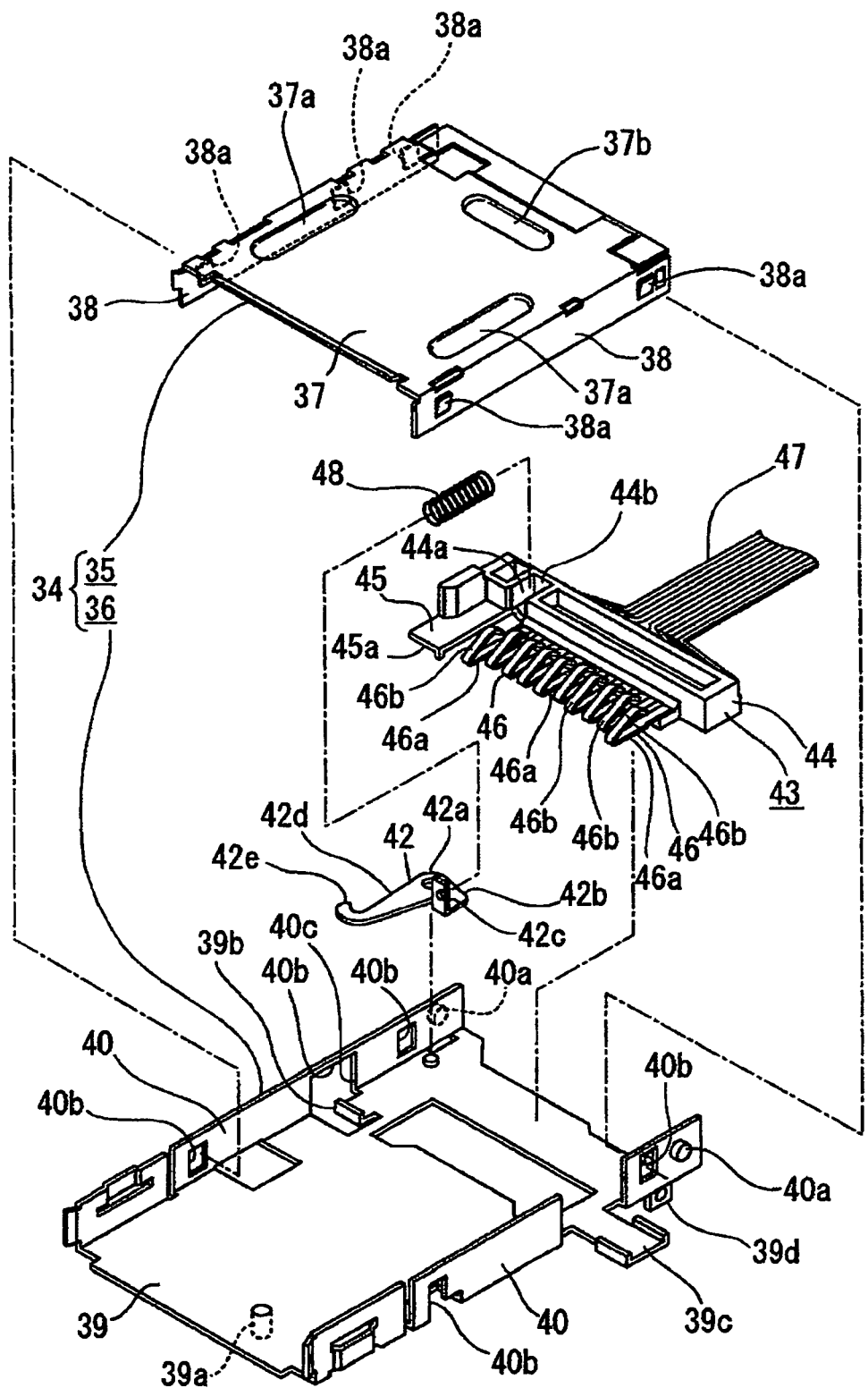
FIG. 14 is an enlarged exploded perspective view showing a holder, a lock lever and a terminal mount member.
Figure 15:
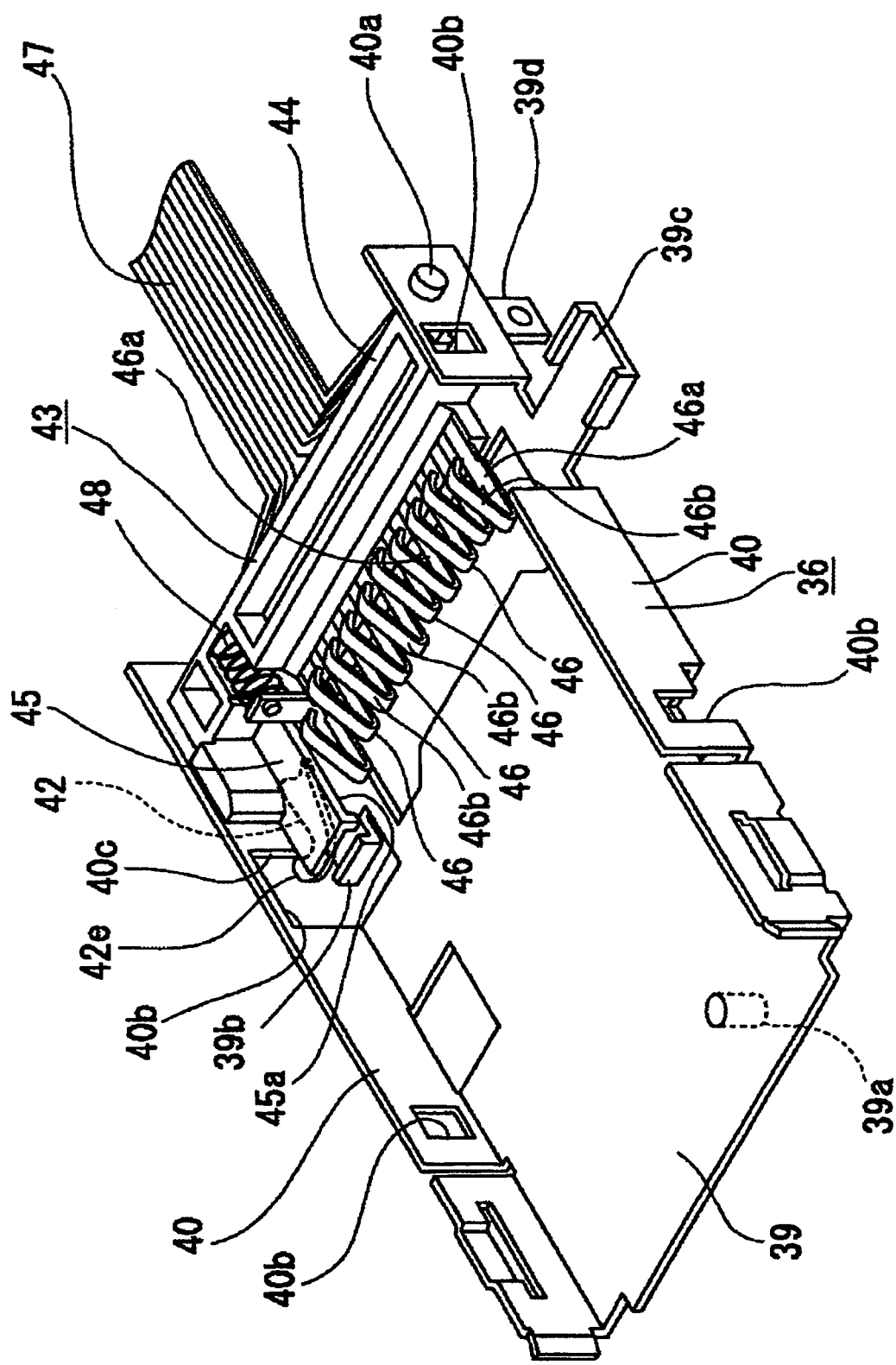
FIG. 15 is an enlarged perspective view showing the condition where the lock lever and the terminal mount member are arranged on a lower shell of the holder.

The lower shell 36 includes a lower surface portion 39 and side surface portions 40, 40 continuous respectively with both left and right side edges of the lower surface portion 39, which are formed integral with each other (see FIGS. 14 and 15).

A pushed pin 39a projected downwards is provided at a position near the front end of the lower surface portion 39. The lower surface portion 39 is provided, at a side edge portion on one side thereof, with a mis-insertion preventive piece 39b formed by bending a part of the lower surface portion 39 upwards. An operating projected portion 39c projected sideways is provided at a position near the rear end of the lower surface portion 39. A spring support piece 39d projected downwards is provided at a position on the rear side of the operating projected portion 39c of the lower surface portion 39.

The side surface portions 40, 40 are provided, at positions near the rear ends thereof, with guided pins 40a, 40a projected outwards. The side surface portions 40, 40 are provided with engagement holes 40b, 40b, . . . spaced from each other in the front-rear direction, respectively. The side surface portion 40 on one side is provided with a lever passing hole 40c at a position in the vicinity of the mis-insertion preventive piece 39b.

The side surfaces 38, 38 of the upper shell 35 are located respectively on the inside of the side surface portions 40, 40 of the lower shell 36, and the upper edges of the engagement pieces 38a, 38a, . . . are engaged with upper-side opening edges of the engagement holes 40b, 40b, . . . , whereby the upper shell 35 and the lower shell 36 are coupled with each other, to constitute the holder 34.

A limiter spring 41 is stretched between the spring hook projected piece 20d of the conveying rack 20 and the spring support piece 39d of the holder 34 (see FIGS. 5 and 10). The limiter spring 41 is, for example, a tension coil spring, and is arranged in the arrangement hole 6b formed in the arrangement base 4. The conveying rack 20 is biased rearwards by the limiter spring 41 and, simultaneously, the holder 34 is biased forwards by the limiter spring 41.

A lock lever 42 is turnably supported in the inside of the holder 34 (see FIGS. 14 and 15). The lock lever 42 is supported on the rear side of the mis-insertion preventive piece 39b of the lower surface portion 39 of the lower shell 36.

The lock lever 42 includes a turning fulcrum portion 42a serving as a fulcrum for turning relative to the lower surface portion 39, a first connection portion 42b projected sideways from the turning fulcrum portion 42a, a spring contact portion 42c projected upwards from the tip end edge of the first connection portion 42b, a second connection portion 42d projected from the turning fulcrum portion 42a in a lateral direction substantially orthogonal to the first connection portion 42b, and a restricting portion 42e bent sideways relative to the second connection portion 42d, which are formed integral with each other. The restricting portion 42e is substantially orthogonal to the second connection portion 42d, and is located at such a position as to be projectable via the lever passing hole 40c on the immediate rear side of the mis-insertion preventive piece 39b.

An electrode mount member 43 is attached to a rear end portion of the lower shell 36 (see FIGS. 14 and 15). The electrode mount member 43 includes a laterally elongate mount portion 44 and a projected portion 45 projected forwards from a left end portion of the mount portion 44, which are integrally formed from a resin material, and the mount portion 44 is provided near its left end with a spring insertion recessed portion 44a opened forwards and upwards. The depth surface of the spring insertion recessed portion 44a is formed as a springy contact surface 44b directed forwards.

A plurality of terminal electrodes 46, 46, . . . are mounted to the mount portion 44 in the manner of being arrayed in the longitudinal direction of the mount portion 44. The pitch of the terminal electrodes 46, 46, . . . is equal to the pitch of the connection terminals 105, 105, . . . of the recording medium 100. The width in the left-right direction of each of the terminal electrodes 46, 46, . . . is smaller than the width in the left-right direction of each of the connection terminals 105, 105, . . . .

The terminal electrodes 46, 46, . . . have base end portions 46a, 46a, . . . which are projected forwards from the mount portion 44 in the state of being partly embedded in the mount portion 44, and springy contact portions 46b, 46b, . . . which are bent to the upper side from the tip ends of the base end portions 46a, 46a, . . . and inclined relative to the base end portions 46a, 46a, . . . . In the terminal electrodes 46, 46, . . . , the springy contact portions 46b, 46b, . . . can be elastically displaced relative to the base end portions 46a, 46a, . . . .

The projected portion 45 is provided on its lower side with an arrangement cutout 45a opened at least forwards.

One end portion of a flexible printed wiring board 47 is embedded in the mount portion 44, and electrode portions formed at the one end portion are connected respectively to the terminal electrodes 46, 46, . . . . The other end portion of the flexible printed wiring board 47 is connected to the wiring board connector 15 mounted on the circuit substrate 11. The flexible printed wiring board 47 is connected between the electrode mount member 43 and the wiring board connector 15, with a part thereof arranged in the arrangement cutout 26a in the rear plate portion 26 of the chassis 22.

In the condition where the electrode mount member 43 is mounted to the lower shell 36, a biasing spring 48 which is for example a compression coil spring is disposed in the spring insertion recessed portion 44a, and both ends of the biasing spring 48 are set in springy contact with a spring contact surface 44b and the spring contact portion 42c of the lock lever 42, respectively. Therefore, the lock lever 42 is biased by the biasing spring 48 in such a direction that the restricting portion 42e is projected outwards through the lever passing hole 40c of the holder 34. The lock lever 42 has a part thereof arranged in the arrangement cutout 45a of the electrode mount member 43.

Now, a loading operation of the loading apparatus 1 and an ejecting operation for ejecting the recording medium 100 loaded will be described below (see FIGS. 16 to 29). Incidentally, the recording medium 100 is inserted into the holder 34 through the slot in the electronic apparatus from the side of the connection portion 102 in the condition where the first principal surface 101a of the casing 101 is directed downwards.

Figure 16:
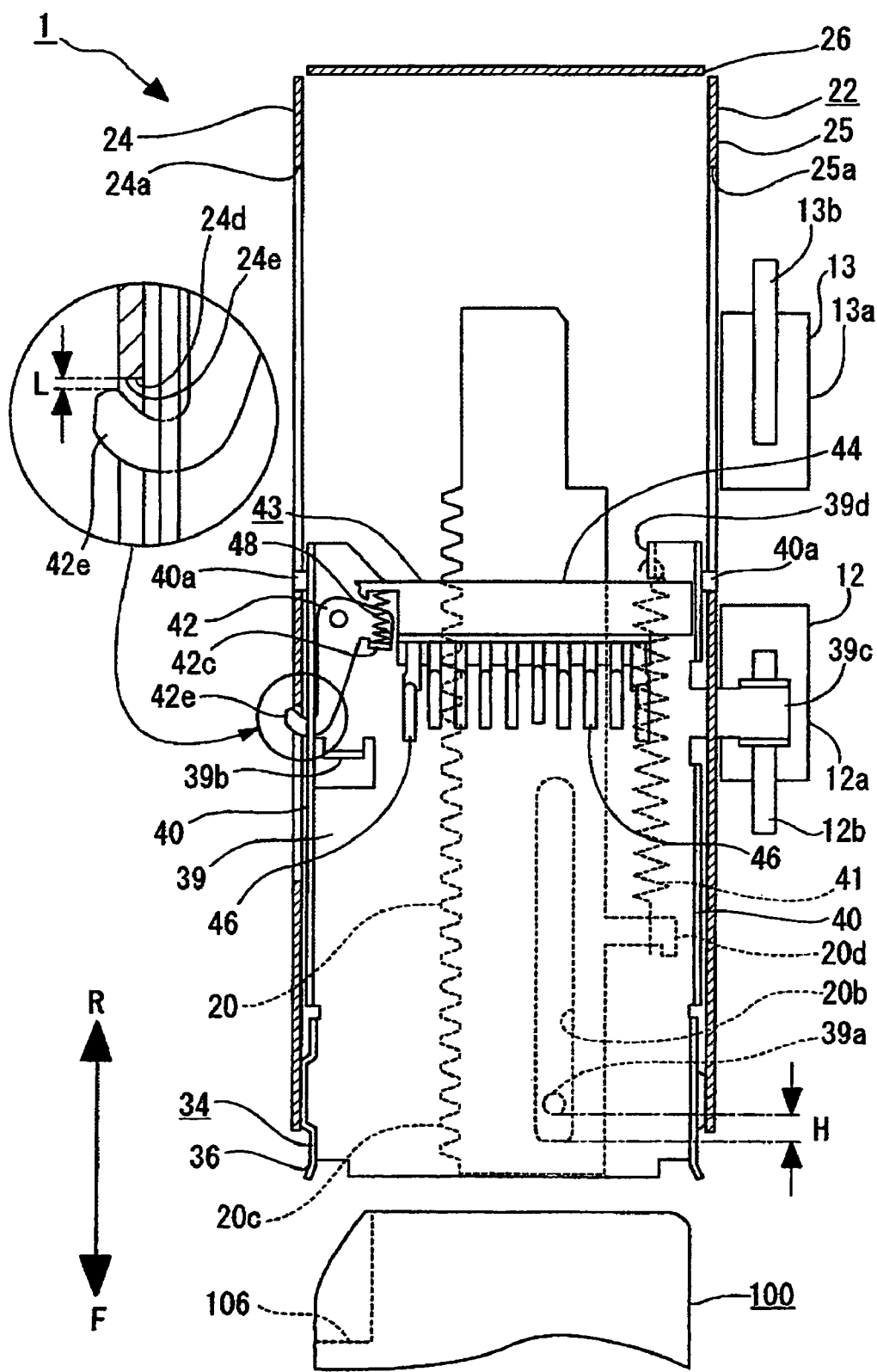
FIG. 16, together with FIGS. 17 to 29, illustrates the operation of the loading apparatus, and is an enlarged plan view showing the condition before the loading.
Figure 17:
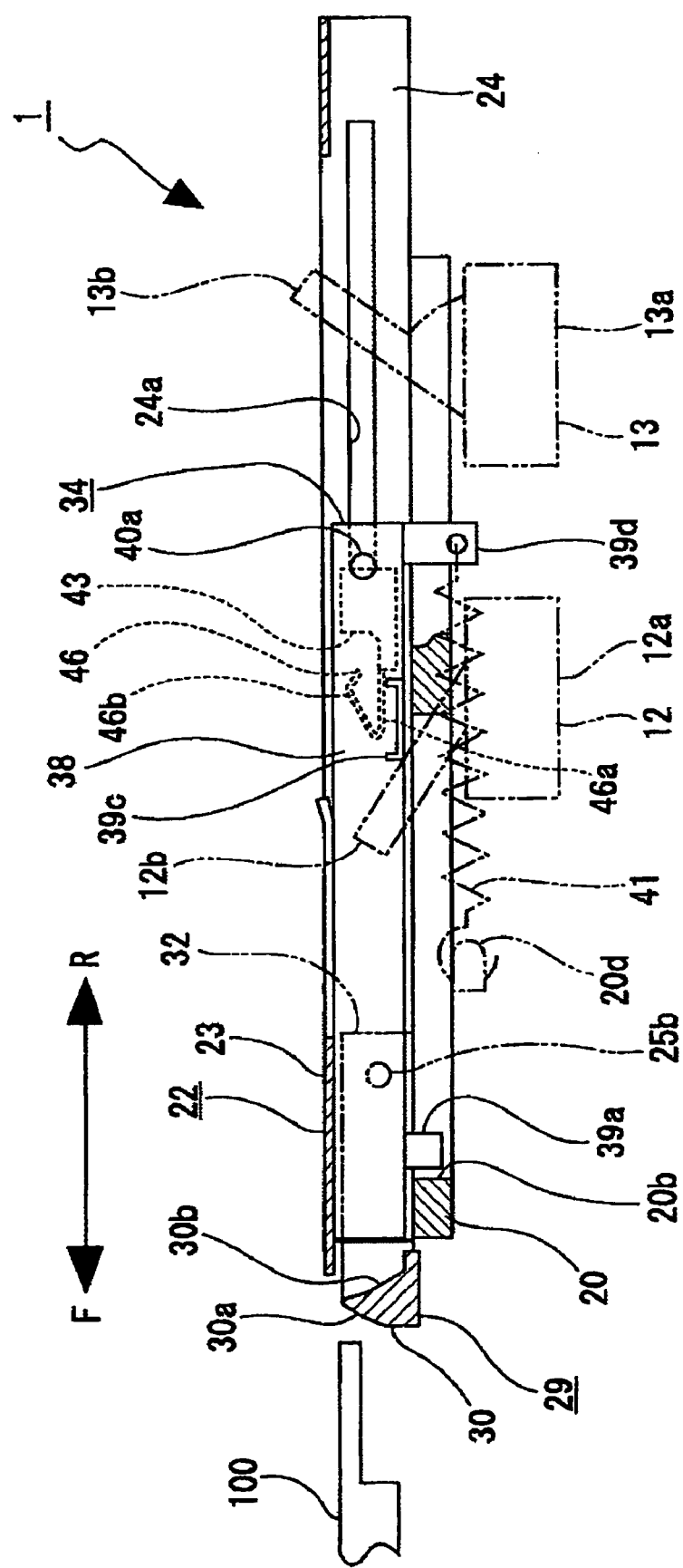
FIG. 17 is an enlarged side view showing the condition before the loading, partly in section.
Figure 18:
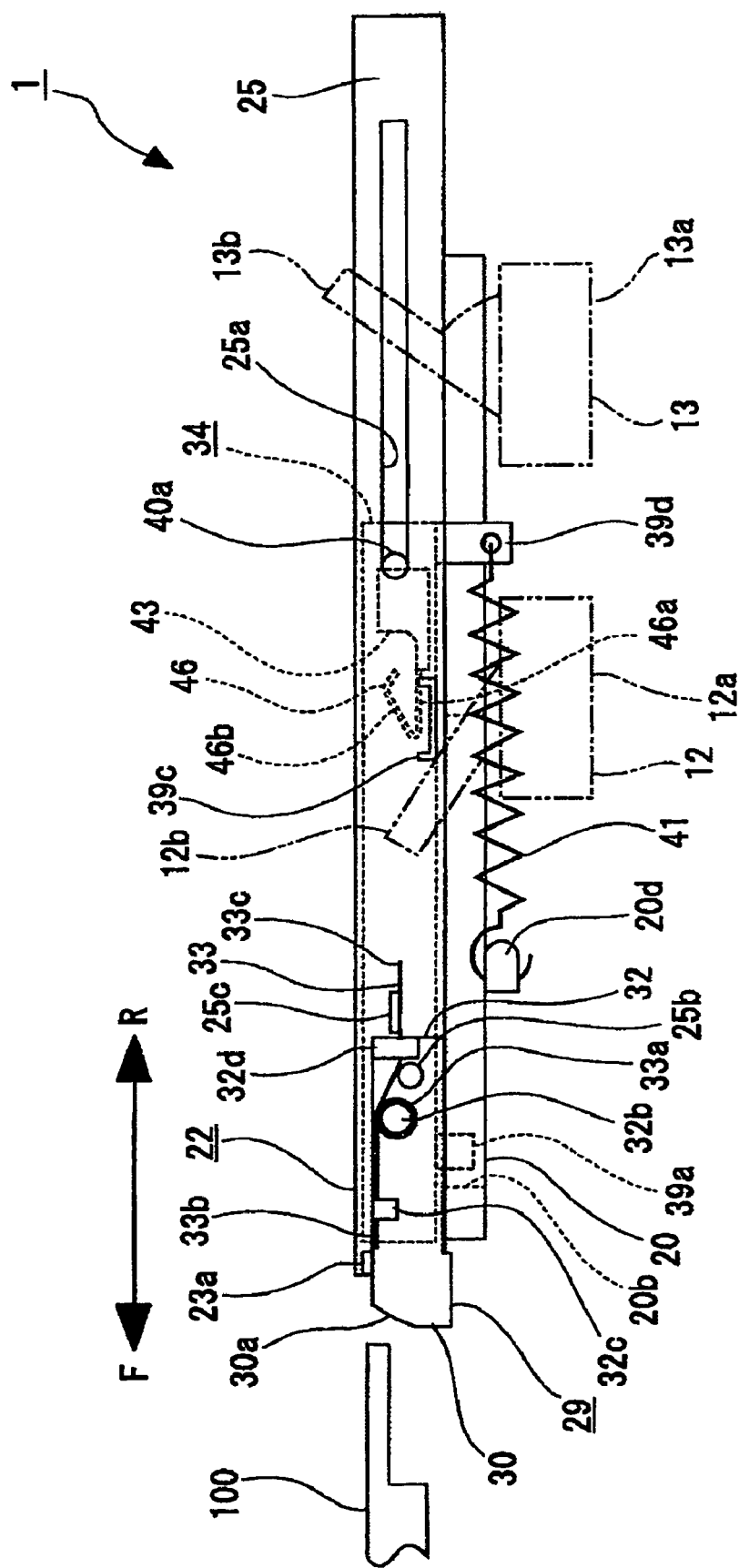
FIG. 18 is an enlarged side view showing the condition before the loading.

First, the conditions of the individual parts of the loading apparatus before the loading of the recording medium 100 is started will be described (see FIGS. 16 to 18).

The conveying rack 20 is located at a movement end on the front side (the F direction shown in the figures). The conveying rack 20 has its rack portion 20c meshed with the worm 19 through the transmission gears 17, 17, 17, and is not moved unless the drive motor 18 is rotated.

The holder 34 is biased forwards by the limiter spring 41 stretched between the holder 34 and the conveying rack 20, and is located at a movement end in the F direction, i.e., an insertion/take-out position where the recording medium 100 is inserted or taken out. At the insertion/take-out position, the guided pins 40a, 40a of the holder 34 are located at the front ends of the guide holes 24a, 25a in the chassis 22.

In the condition where the holder 34 is located at the movement end in the F direction, the pushed pin 39a of the lower shell 36 inserted in the insertion hole 20b in the conveying rack 20 is located near the front end of the insertion hole 20b. Therefore, a gap H is formed between the pushed pin 39a and the front-side opening edge of the insertion hole 20b (see FIGS. 16 and 17).

In the condition where the holder 34 is located at the movement end in the F direction, the operated piece 12b of the changeover switch 12 on the front side is operated by the operating projected portion 39c, and the operated piece 12b is in the operation position. Therefore, the drive motor 18 is stopped. Since the operated piece 13b of the changeover switch 13 is not operated, the operated piece 13b is in the non-operation position.

In the condition where the holder 34 is located at the movement end in the F direction, the restricting portion 42e of the lock lever 42 is projected outwards through the lever passing hole 40c in the holder 34 and the lever passing cutout 24e of the chassis 22. In this instance, a gap L is formed between the restricting portion 42e and the restricted portion 24d of the chassis 22 (see the enlarged view in FIG. 16).

The shutter 29 is biased by the torsion coil spring 33 in such a direction that its opening/closing portion 30 is moved substantially upwards, the upper surfaces of the arm portions 31, 32 make contact with the stopper pieces 23a, 23a of the chassis 22, and the front opening of the chassis 22 is closed with the opening/closing portion 30 of the shutter 29.

Now, the operations when the recording medium 100 is inserted in the slot of the electronic apparatus will be described below (see FIGS. 19 to 28). The insertion of the recording medium 100 into the slot is conducted by the user's pushing of the recording medium 100 to the depth side of the slot, namely, rearwards.

Figure 19:
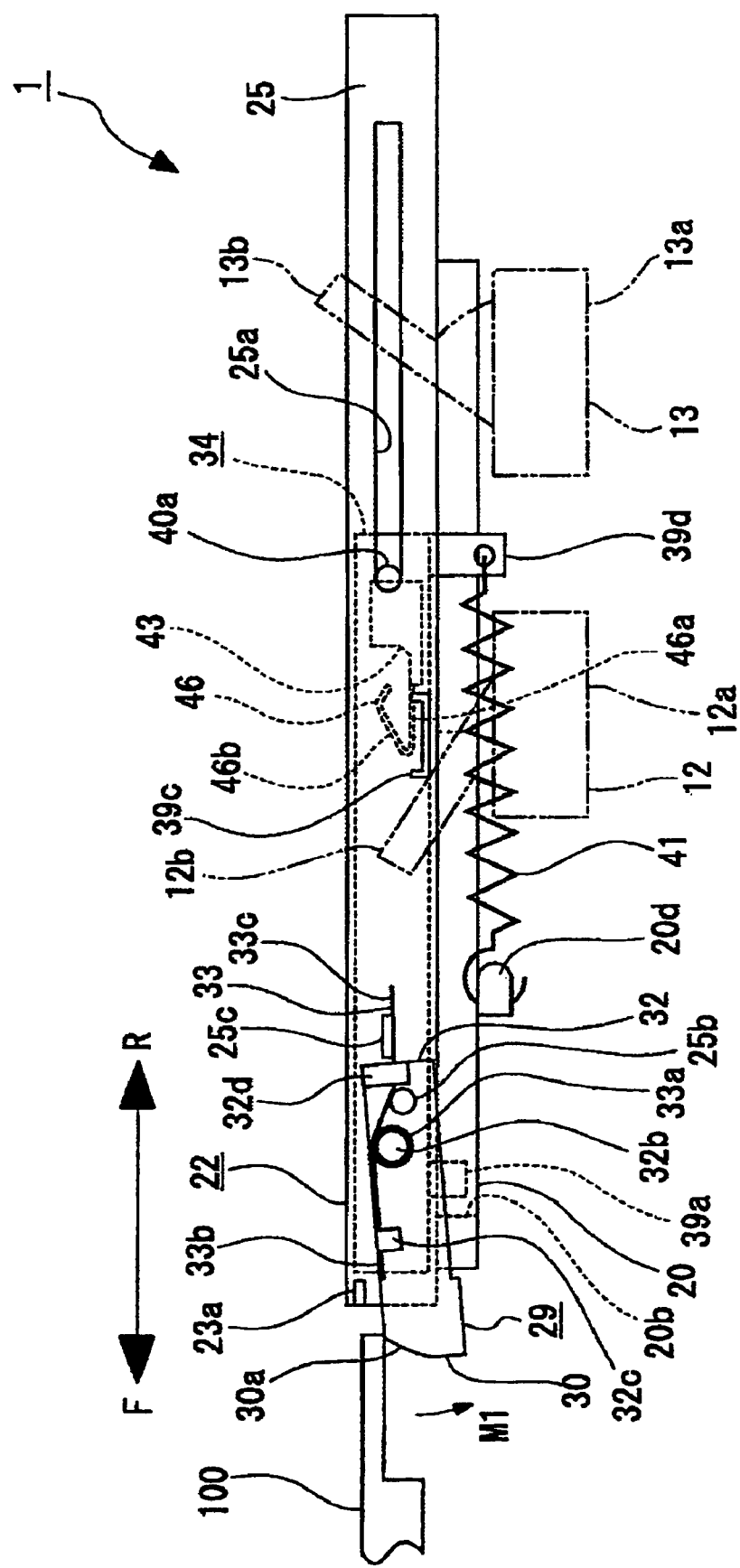
FIG. 19 is an enlarged side view showing the condition where the shutter is open when the recording medium is inserted through a slot.

As the recording medium 100 is inserted through the slot by being pushed, the recording medium 100 is guided by the slot, and the first guide surface 30a of the opening/closing portion 30 of the shutter 29 is gradually pushed by the recording medium 100 (see FIG. 19). Since the first guide surface 30a is inclined so as to be displaced rearwards as one goes upwards, when the first guide surface 30a is gradually pushed by the recording medium 100, the recording medium 100 makes sliding contact with the first guide surface 30a, and the shutter 29 is gradually turned in the direction of spacing away from the stopper pieces 23a, 23a of the chassis 22 (in the M1 direction shown in FIG. 19) against the biasing force of the torsion coil spring 33.

Figure 20:
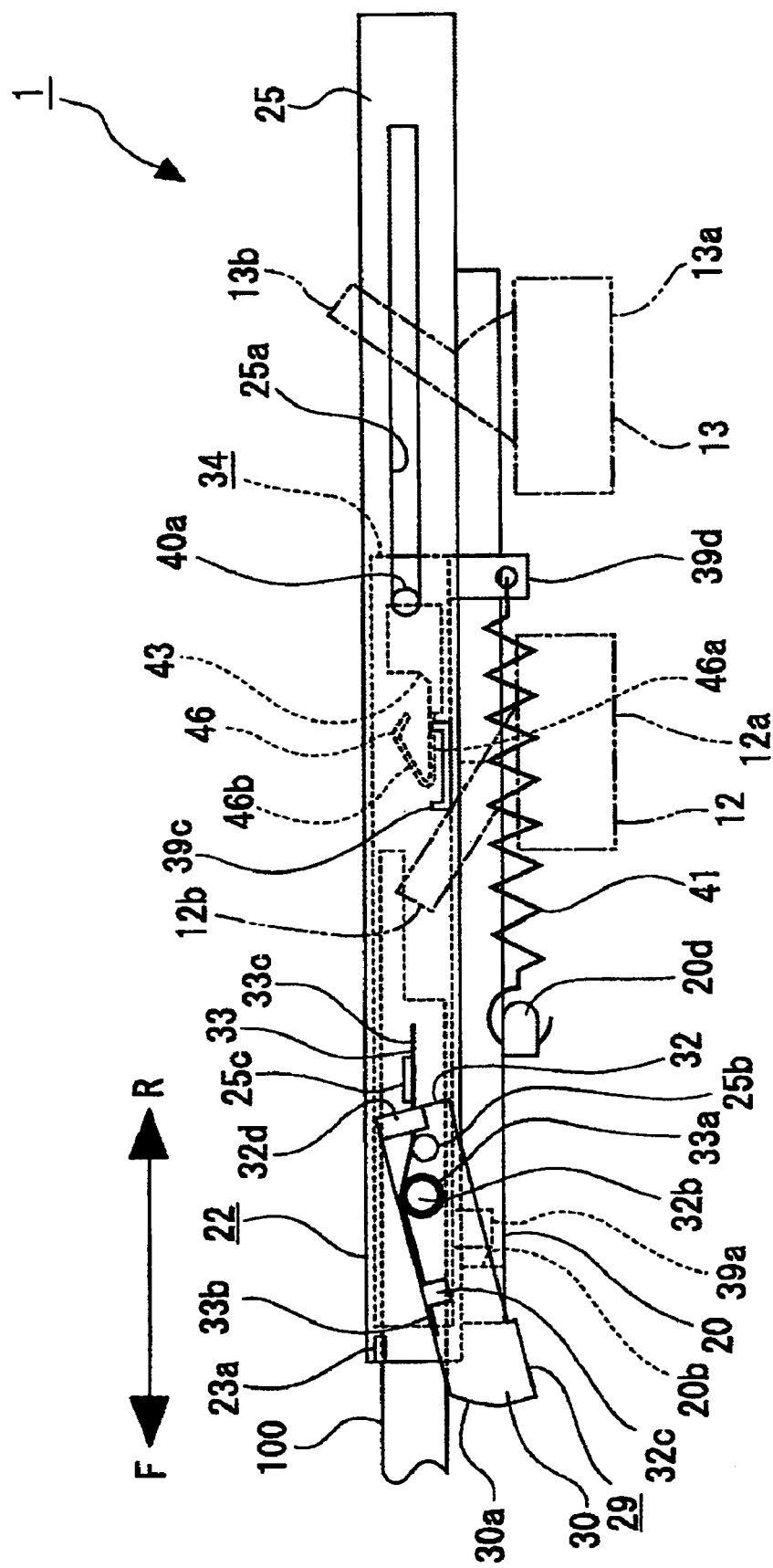
FIG. 20 is an enlarged side view showing the condition where the recording medium is being gradually inserted into the holder.
Figure 21:
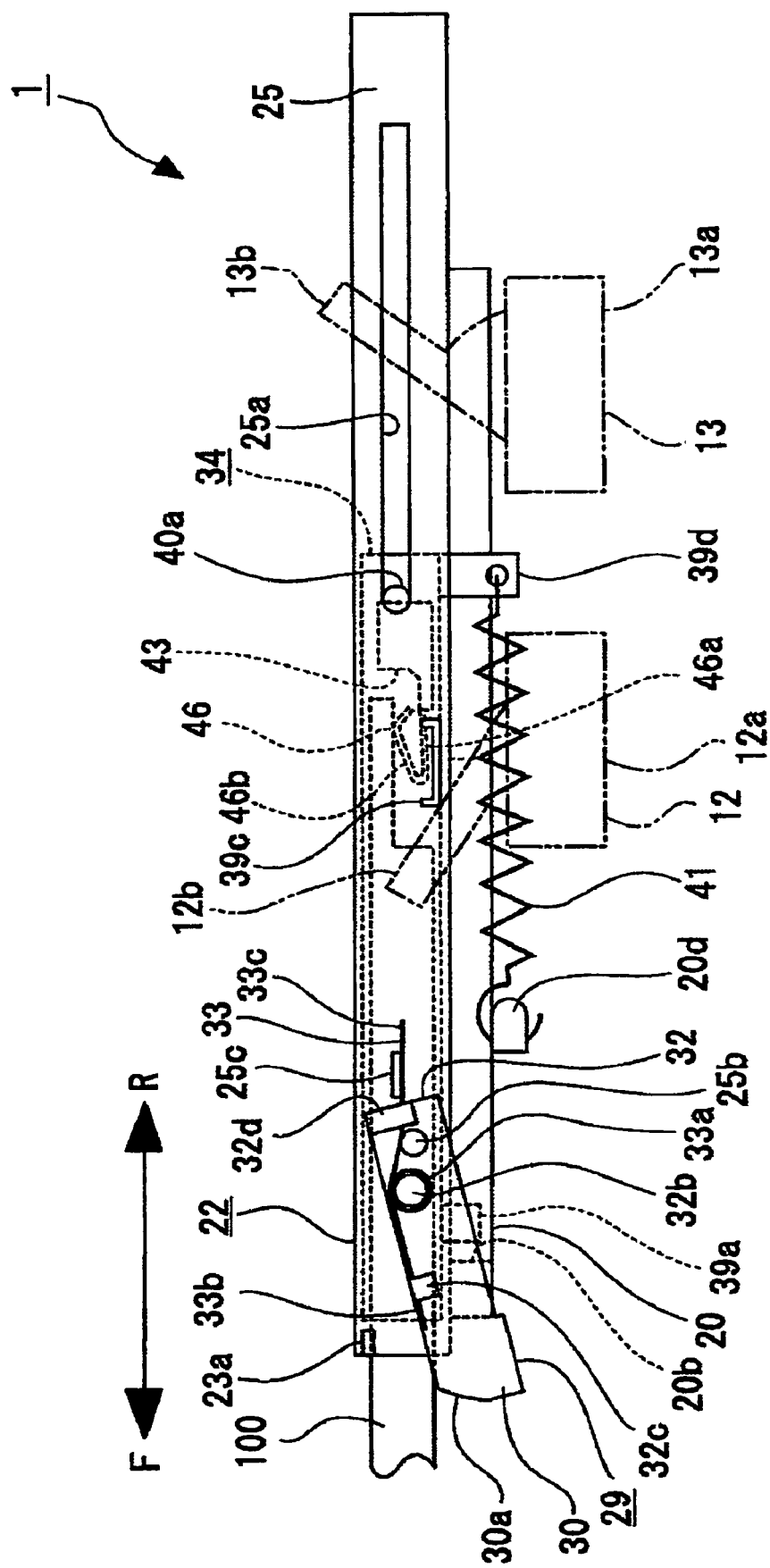
FIG. 21 is an enlarged side view showing the condition where the connection terminals of the recording medium have been connected to terminal electrodes.

With the shutter 29 turned, the front opening of the holder 34 is opened, and the recording medium 100 is gradually inserted into the holder 34 through the front opening (see FIG. 20).

As the recording medium 100 is inserted into the holder 34, the connection terminals 105, 105, . . . are connected respectively to the springy contact portions 46b, 46b, . . . of the terminal electrodes 46, 46, . . . (see FIG. 21). Since the springy contact portions 46b, 46b, . . . are elastically displaced relative to the base end portions 46a, 46a, . . . , the connection terminals 105, 105, . . . are connected in the condition where the springy contact portions 46b, 46b, . . . are brought into springy contact from the lower side. When the recording medium 100 is inserted in the holder 34 in the normal direction, the cutout portion 106 is located correspondingly to the mis-insertion preventive piece 39b of the holder 34, so that the insertion of the recording medium 100 is not restricted by the mis-insertion preventive piece 39b.

Figure 22:
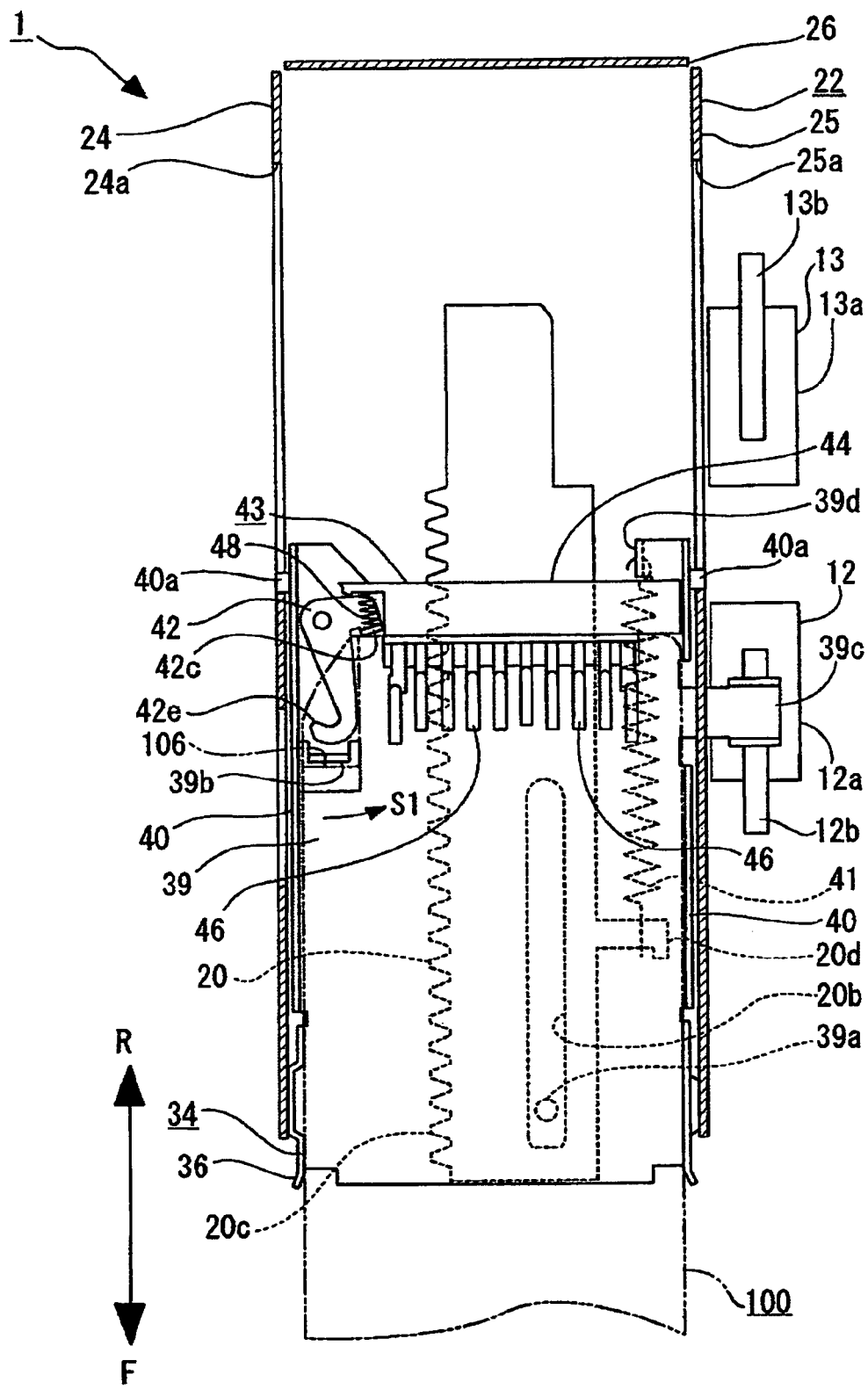
FIG. 22 is an enlarged plan view showing the condition where the lock lever has been turned and the lock of the holder has been released.

As the recording medium 100 is inserted further into the holder 34, the spring contact portion 42c of the lock lever 42 is pushed by the recording medium 100 (see FIG. 22). When the spring contact portion 42c of the lock lever 42 is pushed by the recording medium 100, the lock lever 42 is turned in such a direction that its restricting portion 42e is moved into the inside of the holder 34 (in the S1 direction shown in FIG. 22) against the biasing force of the biasing spring 48, resulting in that the holder 34 can be moved in the R direction relative to the chassis 22. The recording medium 100 is moved in the R direction until it makes contact with the front surface of the mount portion 44 of the electrode mount member 43.

Since the gap L is formed between the restricting portion 42e of the lock lever 42 and the restricted portion 24d of the chassis 22 as described above, the restricting portion 42e does not make contact with the restricted portion 24d when the lock lever 42 is turned. Therefore, it is possible to reduce the load at the time of turning of the lock lever 42, and to prevent the restricting portion 42e and the restricted portion 24d from being scratched or worn.

Figure 23:
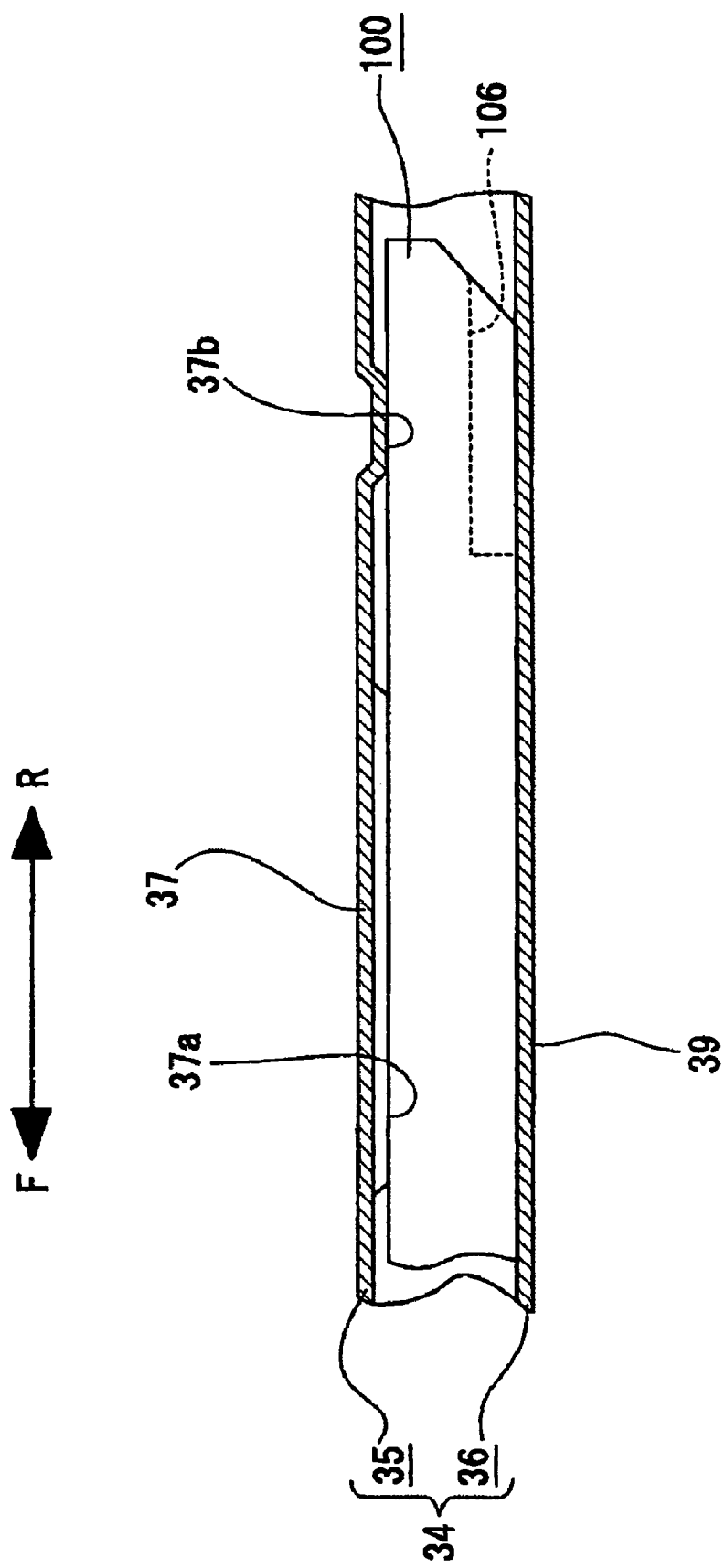
FIG. 23 is an enlarged sectional view showing the condition where the recording medium is held in a holding portion of the holder.

In the condition where the recording medium 100 is inserted in the holder 34, the second principal surface on the opposite side of the first principal surface 101a of the recording medium 100 is held in springy contact with the holding portions 37a, 37a, 37b formed integral with the upper shell 35 of the holder 34 (see FIG. 23).

Thus, in the loading apparatus 1, the holding portions 37a, 37a, 37b for holding the recording medium 100 inserted in the holder 34 are formed to be integral with the holder 34, so that there is no need for component parts for exclusive use for holding the recording medium 100, it is possible to reduce the number of component parts, there is no need for a complicated holding mechanism, and it is possible to contrive a simpler mechanism.

In addition, since the holding portions 37a, 37a, 37b are formed by embossing parts of the holders 34, the processing is easy, and the configuration is simple, so that it is possible to contrive a reduction in the manufacturing cost of the loading apparatus 1.

Figure 24:
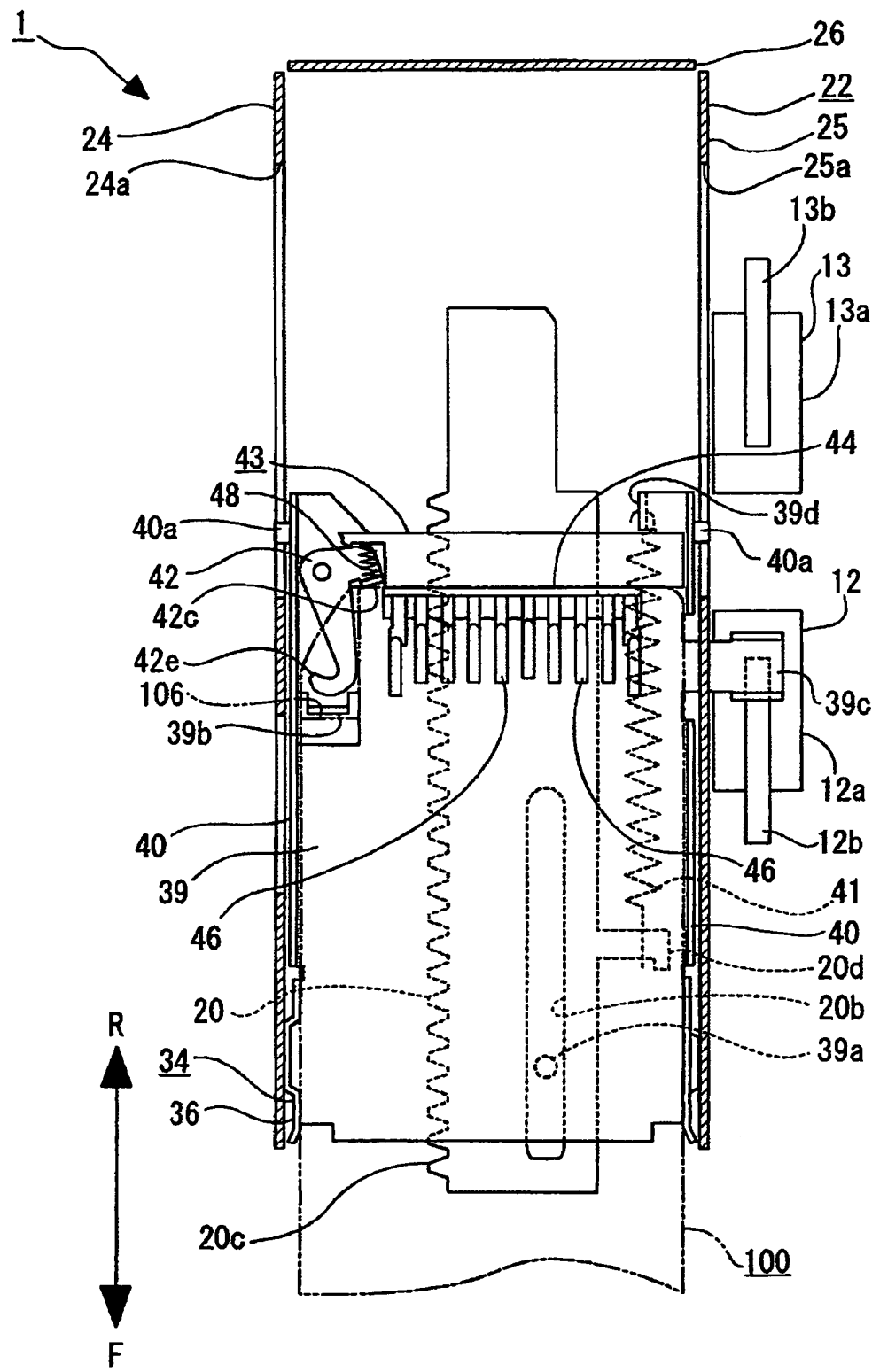
FIG. 24 is an enlarged plan view showing the condition where the holder has been moved and a limiter spring has been extended.
Figure 25:
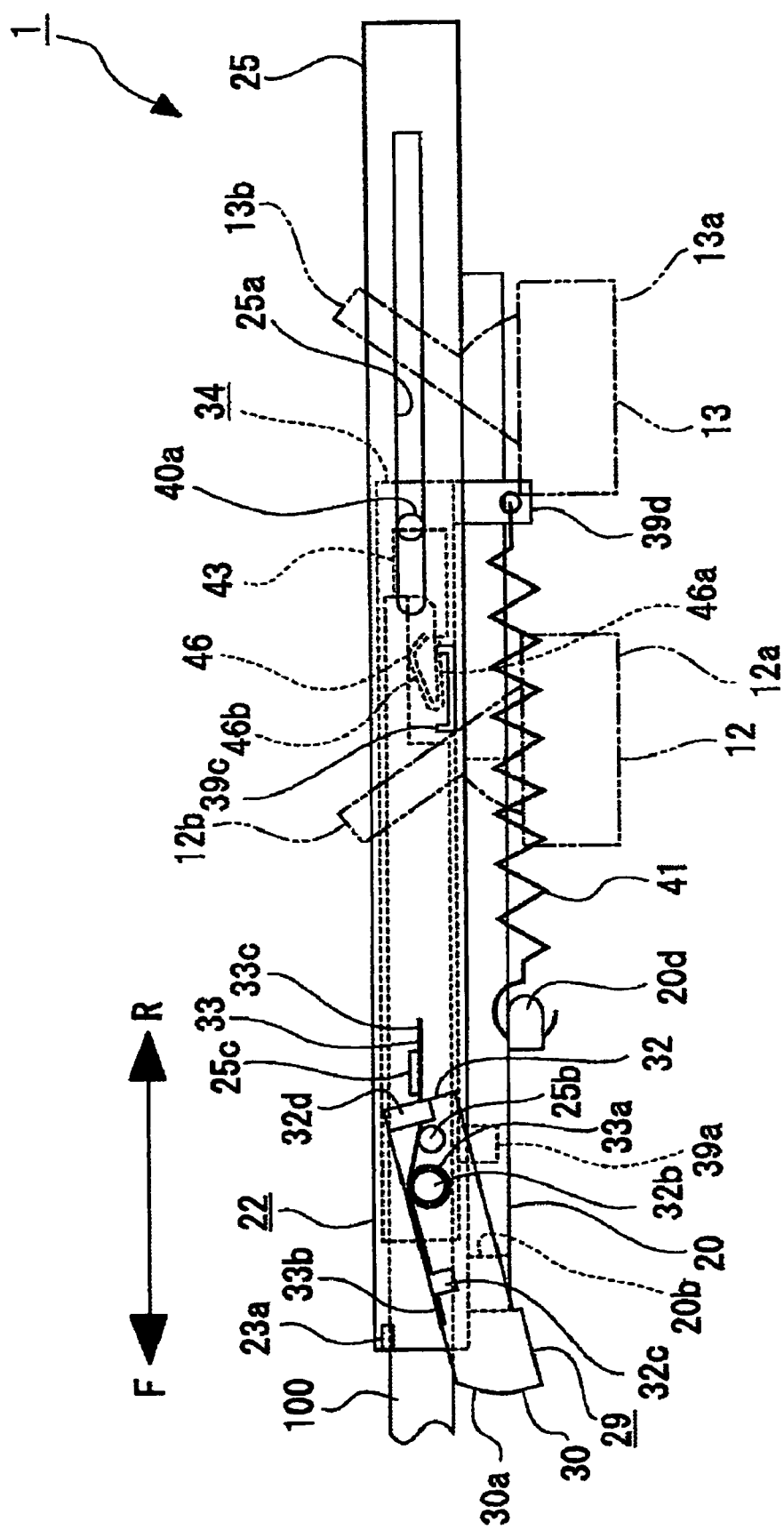
FIG. 25 is an enlarged side view showing the condition where the holder has been moved and the limiter spring has been extended.

In the condition where the lock lever 42 has been turned in the S1 direction and the recording medium 100 has come into contact with the front surface of the mount portion 44, when the recording medium 100 is further moved in the R direction under pushing, the mount portion 44 is pushed by the recording medium 100, and the holder 34 and the recording medium 100 are gradually moved in the R direction as one body (see FIGS. 24 and 25). In this instance, the drive motor 18 is not being rotated, so that the conveying rack 20 is not moved, and the holder 34 is gradually moved in the R direction relative to the conveying rack 20. Therefore, the limiter spring 41 stretched between the conveying rack 20 and the holder 34 is extended.

In this case, if the conveying rack 20 is moved attendant on the holder 34, the rack portion 20c of the conveying rack 20 and the transmission gear 17 meshed therewith might be broken or deformed because of a load exerted thereon. In the loading apparatus 1, however, since the holder 34 and the conveying rack 20 are linked to each other through the limiter spring 41, the holder 34 is moved relative to the conveying rack 20, and the rack portion 20c and the transmission gear 17 can be prevented from being broken or deformed.

In addition, since the holder 34 and the conveying rack 20 can be moved independently, it is unnecessary to strictly design the positional accuracy between the holder 34 and the conveying rack 20, so that it is possible to contrive a higher degree of freedom in designing.

When the holder 34 is moved, the flexible printed wiring board 47 is bent according to the position of the holder 34.

When the holder 34 and the recording medium 100 are moved as one body in the R direction relative to the conveying rack 20, the operation on the changeover switch 12 by the operating projected portion 39c is released, the operated piece 12b comes into the non-operation position (see FIG. 25), and the rotation of the drive motor 18 is started. With the drive motor 18 rotated, the conveying rack 20 is gradually moved in the R direction.

Figure 26:
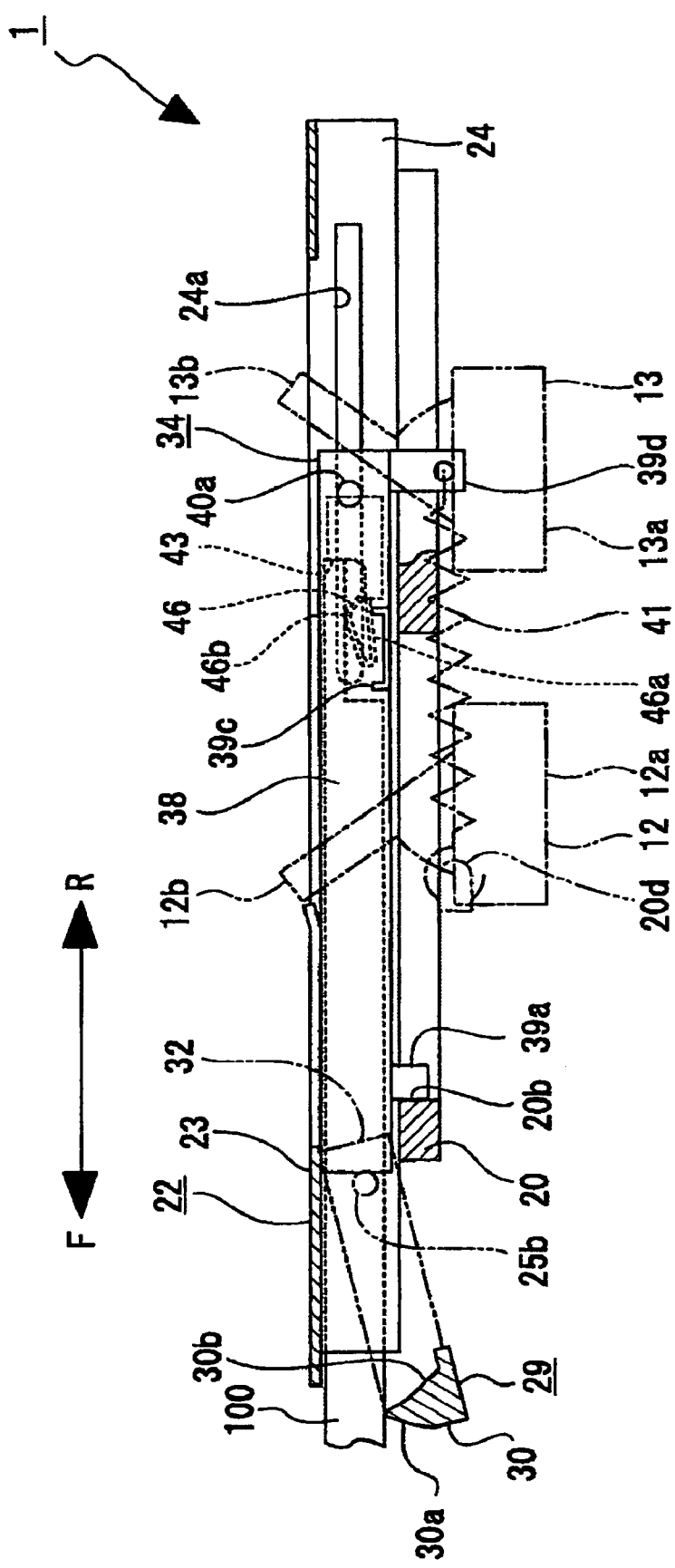
FIG. 26 is an enlarged side view showing the condition where the holder is being moved together with the conveying rack, partly in section.

When the conveying rack 20 is moved in the R direction, the pushed pin 39a of the holder 34 is pushed by the front-side opening edge of the insertion hole 20b, and the holder 34 is gradually moved in the R direction by the drive force of the drive motor 18 (see FIG. 26). Therefore, since the holder 34 and the recording medium 100 are automatically drawn in, it is unnecessary for the operator to further push the recording medium 100. When the holder 34 is moved by the drive force of the drive motor 18, the condition is established in which the front-side opening edge of the insertion hole 20b and the pushed pin 39a of the holder 34 make contact with each other, and the limiter spring 41 having been extended is again compressed.

Figure 27:
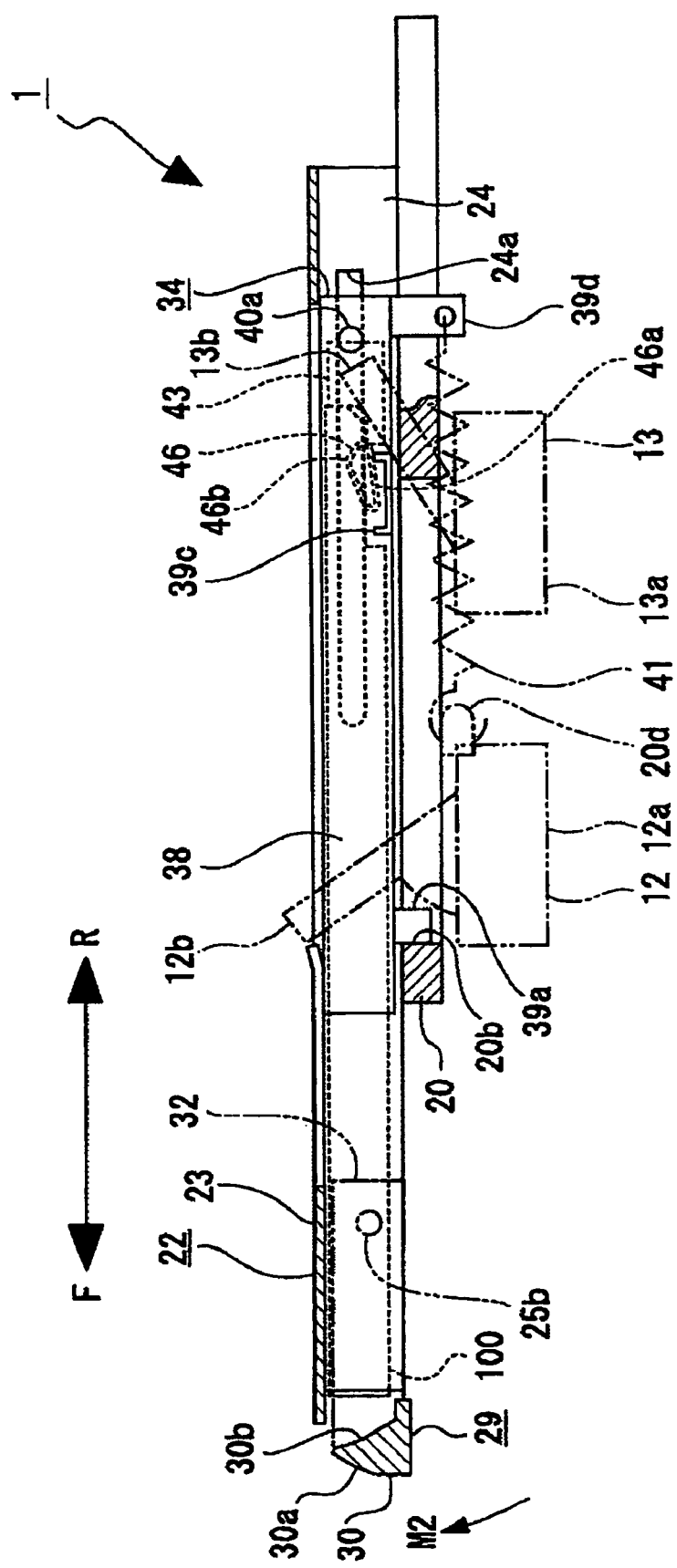
FIG. 27 is an enlarged side view showing the condition where the loading operation is completed, partly in section.
Figure 28:
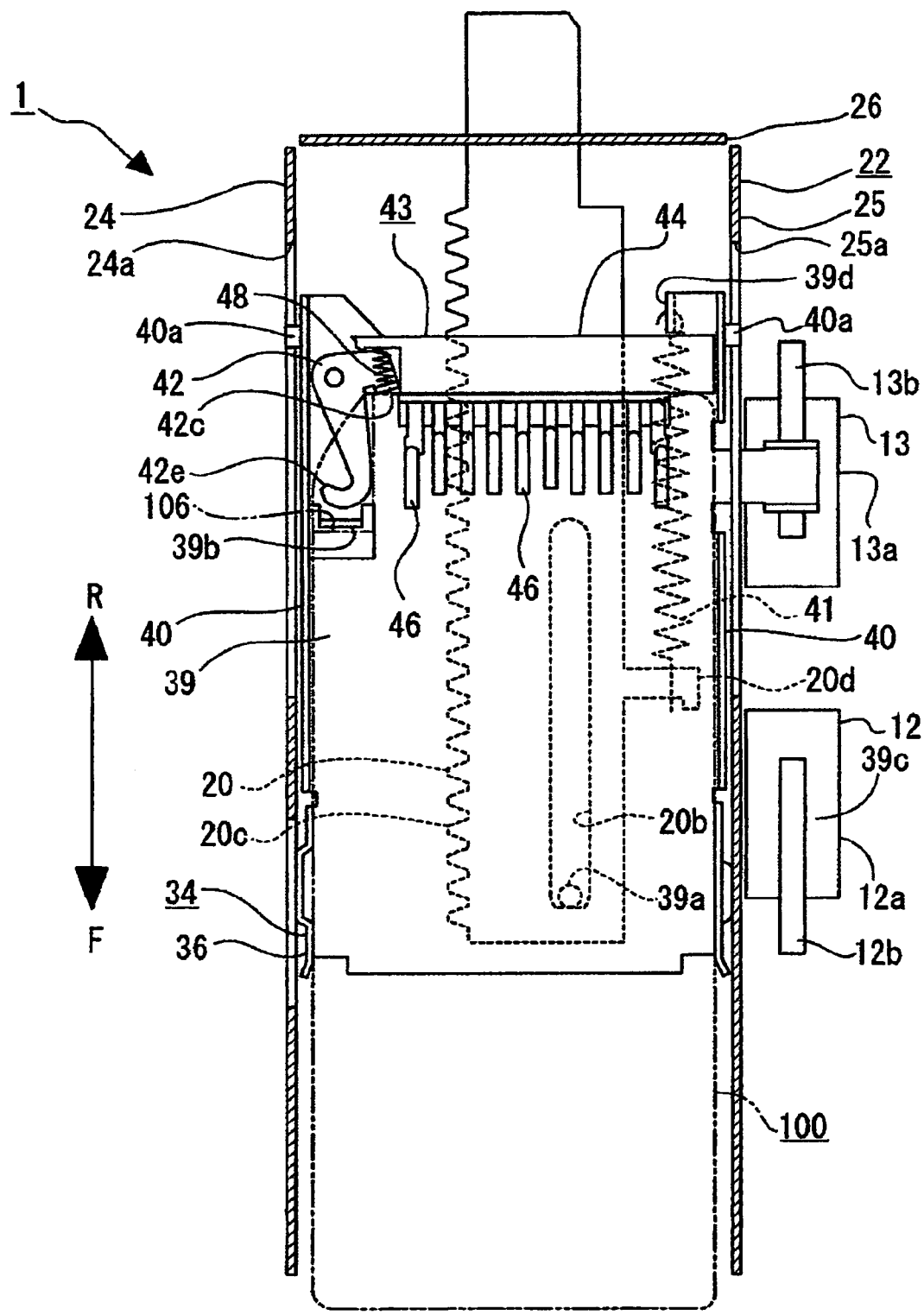
FIG. 28 is an enlarged plan view showing the condition where the loading operation is completed.

When the holder 34 is moved further in the R direction by the drive force of the drive motor 18, the operated piece 13b of the changeover switch 13 on the rear side is operated by the operating projected portion 39c, to get into the operation position (see FIG. 27). When the operated piece 13b of the changeover switch 13 is operated, the rotation of the drive motor 18 is stopped after the lapse of a predetermined time, and the holder 34 is moved to and stopped at a completion position where the loading of the recording medium 100 is completed, whereby the loading operation is completed (see FIG. 28). In the condition where the holder 34 is stopped at the completion position, the whole part of the recording medium 100 is moved to the rear side of the opening/closing portion 30 of the shutter 29, the shutter 29 is turned in the direction for approaching the stopper pieces 23a, 23a of the chassis 22 (the M2 direction shown in FIG. 27) by the biasing force of the torsion coil spring 33, the upper surfaces of the arm portions 31, 32 make contact with the stopper pieces 23a, 23a, and the front opening of the chassis 22 is closed with the opening/closing portion 30 of the shutter 29.

Next, an ejecting operation for ejecting the recording medium 100 held in the holder 34 moved to the completion position will be described.

The ejecting operation is started when an ejection button (not shown) provided on the housing of the electronic apparatus is operated.

With the ejection button operated, the drive motor 18 is rotated in the direction reverse to the above, and the conveying rack 20 is gradually moved in the F direction. With the conveying rack 20 moved in the F direction, the operation on the operated piece 13b of the changeover switch 13 on the rear side by the operating projected portion 39c of the holder 34 is released, and the operated piece 13b is put into the non-operation position. With the conveying rack 20 moved in the F direction, the holder 34 connected to the conveying rack 20 through the limiter spring 41 is moved in the F direction as one body with the conveying rack 20, and the recording medium 100 held in the holder 34 is gradually moved in the F direction.

Figure 29:
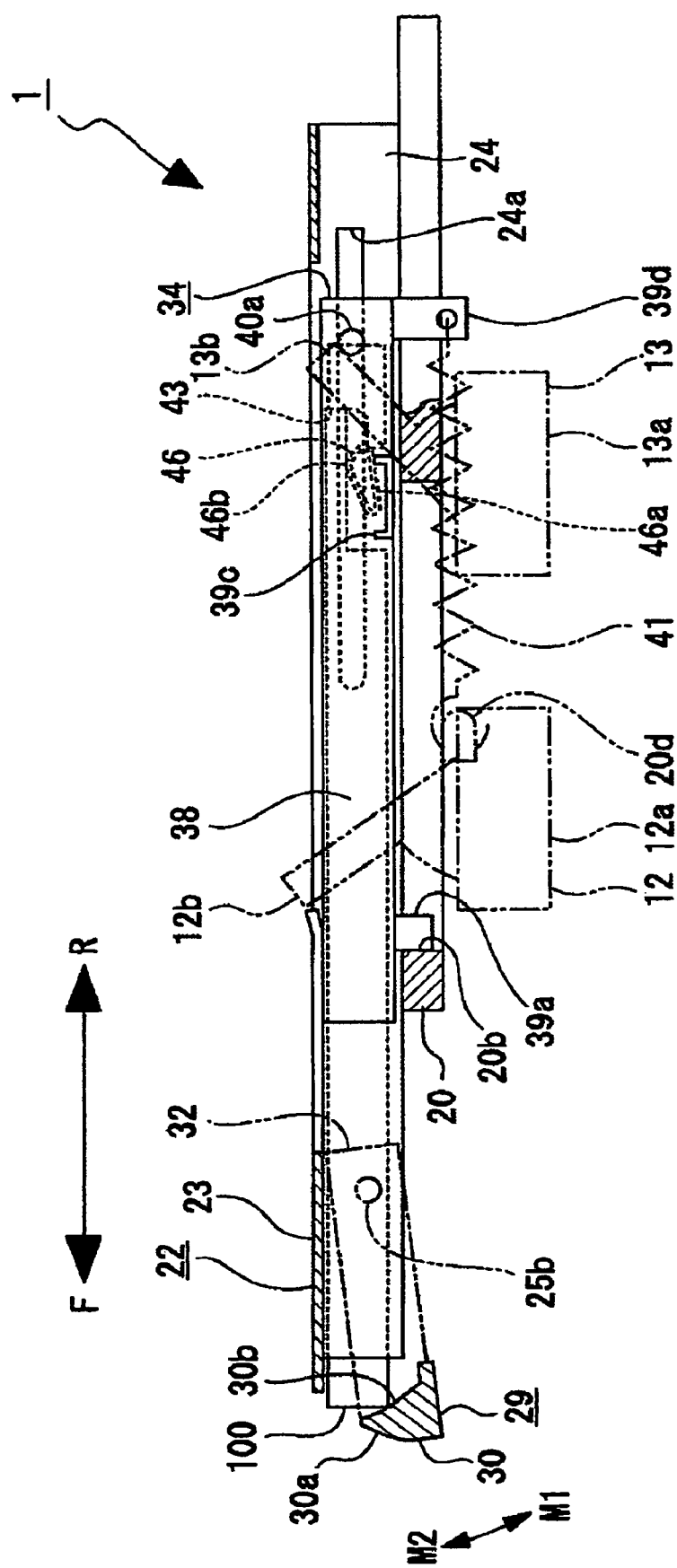
FIG. 29 is an enlarged side view showing the condition where the shutter is open at the time of an ejecting operation, partly in section.

As the recording medium 100 is moved in the F direction, the second guide surface 30b of the opening/closing portion 30 of the shutter 29 is gradually pushed by the recording medium 100 (see FIG. 29). Since the second guide surface 30b is inclined so as to be displaced forwards as one goes upwards, when the second guide surface 30b is gradually pushed by the recording medium 100, the recording medium 100 makes sliding contact with the second guide surface 30b, and the shutter 29 is gradually turned in the direction of spacing away from the stopper pieces 23a, 23a of the chassis 22 (the M1 direction shown in FIG. 29) against the biasing force of the torsion coil spring 33.

With the shutter 29 turned, the front opening of the holder 34 is opened, and the recording medium 100 is gradually discharged to the exterior through the front opening and the slot.

When the holder 34 is moved further in the F direction by the drive force of the drive motor 18, the operated piece 12b of the changeover switch 12 is operated, to come to the operation position. Even when the operated piece 12b of the changeover switch 12 is operated, the rotation of the drive motor 18 is not stopped immediately, and the holder 34 is stopped at such a position that the guided pins 40a, 40a are located at the front ends of the guide holes 24a, 25a in the chassis 22, namely, an insertion/take-out position. When the holder 34 is moved to the insertion/take-out position, the lock lever 42 is turned by the biasing force of the biasing spring 48, and the restricting portion 42e is projected outwards through the lever passing hole 40c in the holder 34 and the lever passing hole 24e in the chassis 22. In this instance, the gap L is formed between the restricting portion 42e and the restricted portion 24d of the chassis 22.

The rotation of the drive motor 18 is stopped after the lapse of a predetermined time, for example, 100 msec, from the moment when the operated piece 12b of the changeover switch 12 is operated. Therefore, the gap H is formed between the front-side opening edge of the insertion hole 20b in the conveying rack 20 and the pushed pin 39a of the holder 34.

With the conveying rack 20 moved in the F direction until the gap H is formed between the front-side opening edge of the insertion hole 20b in the conveying rack 20 and the pushed pin 39a of the holder 34 in this manner, the holder 34 is biased in the F direction by the limiter spring 41, the guided pins 40a, 40a of the holder 34 are pressed against the front-side opening edges of the guide holes 24a, 25a, and the gap L is securely formed between the restricting portion 42e of the lock lever 42 and the restricted portion 24d of the chassis 22.

In the condition where the drive motor 18 is stopped, a part of the recording medium 100 is projected outwards through the slot in the electronic apparatus, so that the operator can draw out the recording medium 100 by gripping the portion of the recording medium 100 projected through the slot. With the recording medium 100 drawn out, the shutter 29 is turned in the direction for approaching the stopper pieces 23a, 23a of the chassis 22 (the M2 direction shown in FIG. 29) by the biasing force of the torsion coil spring 33, the upper surfaces of the arm portions 31, 32 make contact with the stopper pieces 23a, 23a, and the front opening of the chassis 22 is closed with the opening/closing portion 30 of the shutter 29.

Figure 30:
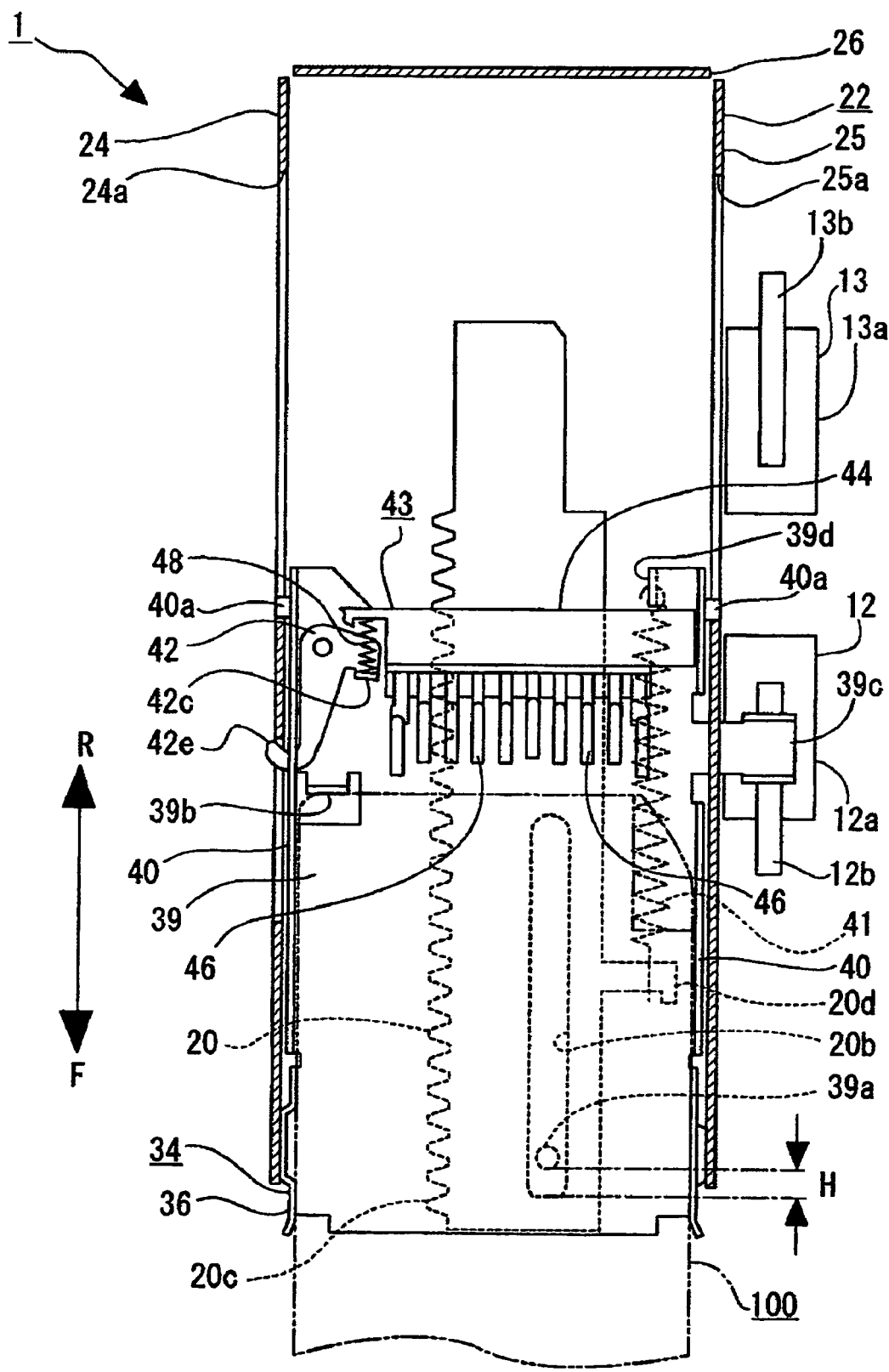
FIG. 30 is an enlarged plan view showing the condition where the recording medium is inserted in the holder in an inappropriate direction.

Next, the operations in the case where the recording medium 100 has been inserted in other direction than the normal direction (in an inappropriate direction) will be described (see FIG. 30).

In the case where the recording medium 100 is inserted into the holder 34 in the direction inverted relative to the normal direction or from the opposite side of the connection portion 102, a part of the casing 101 is brought into contact with the mis-insertion preventive piece 39b of the holder 34, whereby further insertion of the recording medium 100 is inhibited. In the condition where a part of the casing 101 is brought in contact with the mis-insertion preventive piece 39b, the recording medium 100 does not make contact with the lock lever 42 or the terminal electrodes 46, 46, . . . , the holder 34 is not moved in the R direction, and the terminal electrodes 46, 46, . . . are prevented from being damaged.

As has been described above, in the loading apparatus 1, the lock lever 42 for locking the holder 34 in the insertion/take-out position is provided, and the locking of the holder 34 in the insertion/take-out position by the lock lever 42 is released when the connection terminals 105, 105, . . . of the recording medium 100 are connected to the terminal electrodes 46, 46, . . . , therefore, the loading operation is started after the connection terminals 105, 105, . . . are securely connected to the terminal electrodes 46, 46, . . . , and it is possible to secure a good connection condition between the connection terminals 105, 105, . . . of the recording medium 100 and the terminal electrodes 46, 46, . . . .

In addition, in the loading apparatus 1, the terminal electrodes 46, 46, . . . are mounted to the holder 34 through the electrode mount member 43, so that only the positional accuracy of the terminal electrodes 46, 46, . . . relative to the holder 34 and the positional accuracy of insertion of the recording medium 100 in the holder 34 influence the connection condition between the connection terminals 105, 105, . . . and the terminal electrodes 46, 46, . . . . Therefore, it is possible to secure a better connection condition between the connection terminals 105, 105, . . . of the recording medium 100 and the terminal electrodes 46, 46, . . . , as compared with the case where the terminal electrodes are mounted to a member for supporting the holder movably.

Furthermore, in the loading apparatus 1, the drive condition of the drive motor 18 is changed over through the operation of the operated pieces 12b, 13b of the changeover switches 12, 13 by the operating projected portion 39c provided on the holder 34, so that an enhancement of the reliability of operations can be contrived with a simple mechanism.

Incidentally, in the loading apparatus 1, a mechanism for locking the inserted recording medium 100 in the holder 34 is not provided, whereby simplification of mechanism is contrived.

Since the loading apparatus 1 is thus not provided with a mechanism for locking the recording medium 100, the recording medium 100 might be drawn out of the holder 34 in the course of loading. In view of this, in the loading apparatus 1, it is determined whether or not the connection terminals 105, 105, . . . of the recording medium 100 are connected to the terminal electrodes 46, 46, . . . , and, when it is determined that the connection has not been attained, the drive motor 18 is immediately rotated reversely, to thereby move the holder 34 to the insertion/take-out position.

In addition, there is the possibility that the recording medium 100 might be again inserted into the holder 34 in the course of the movement of the holder 34 to the insertion/take-out position by this reverse rotation of the drive motor 18, but, since the loading apparatus 1 is not provided with a mechanism for locking the recording medium 100, there is no fear that the recording medium 100 might be broken by making contact with a locking mechanism, even if the recording medium 100 is inserted into the holder 34.

Figure 31:
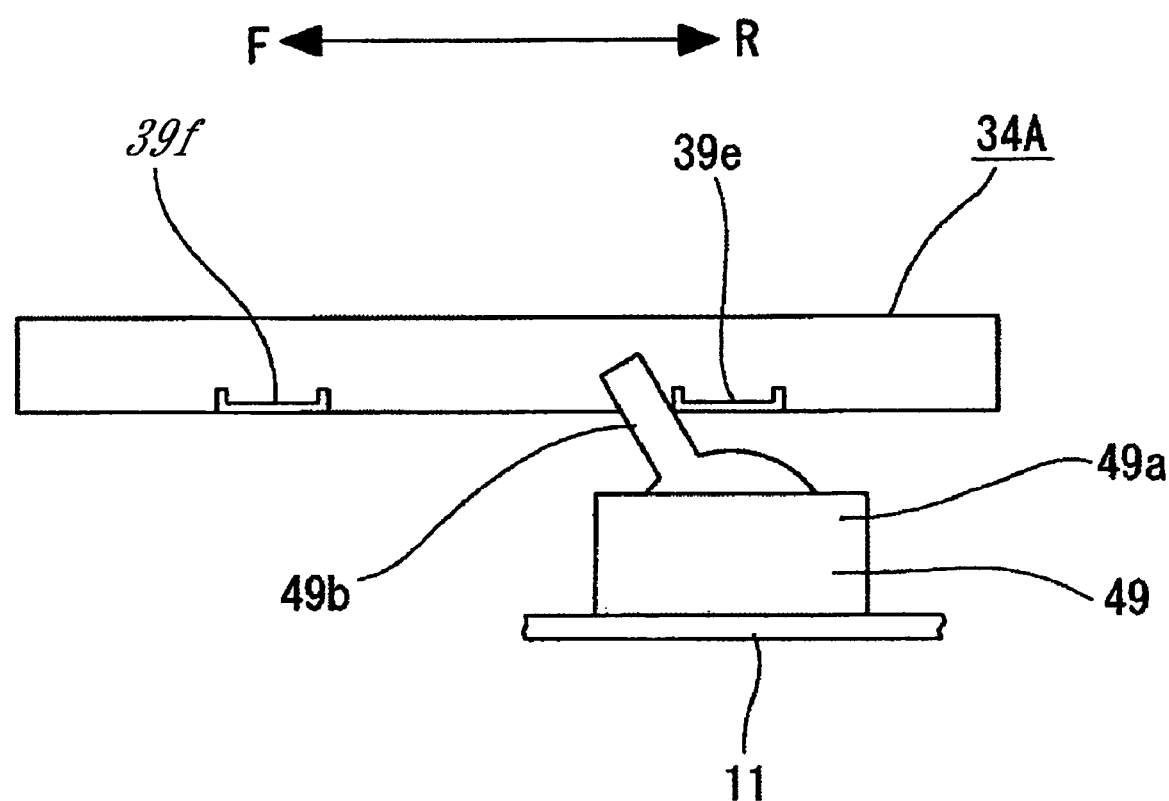
FIG. 31, together with FIGS. 32 and 33, illustrates the case where the loading operation and the ejecting operation are conducted by use of one changeover switch, and is a general side view showing the condition where the changeover switch is being operated by an operating projected portion on one side.
Figure 32:
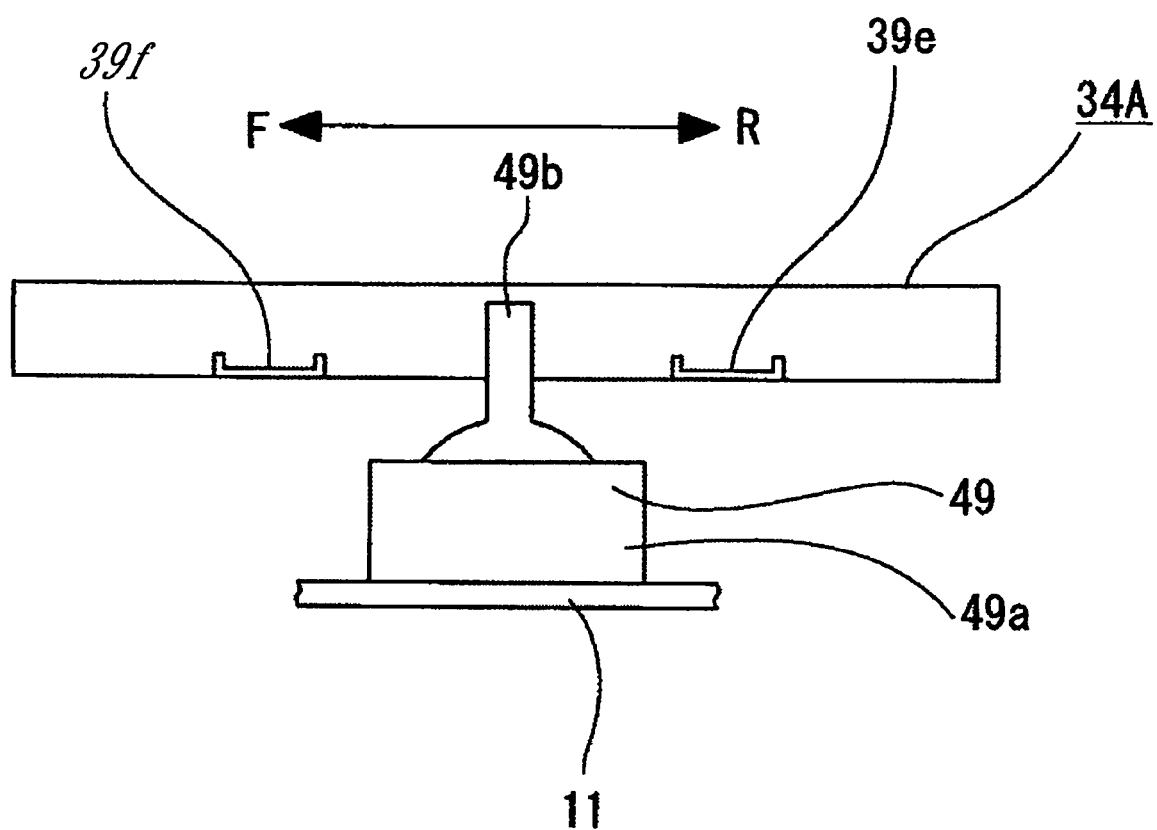
FIG. 32 is a general side view showing the condition where the operation on the changeover switch has been released.
Figure 33:
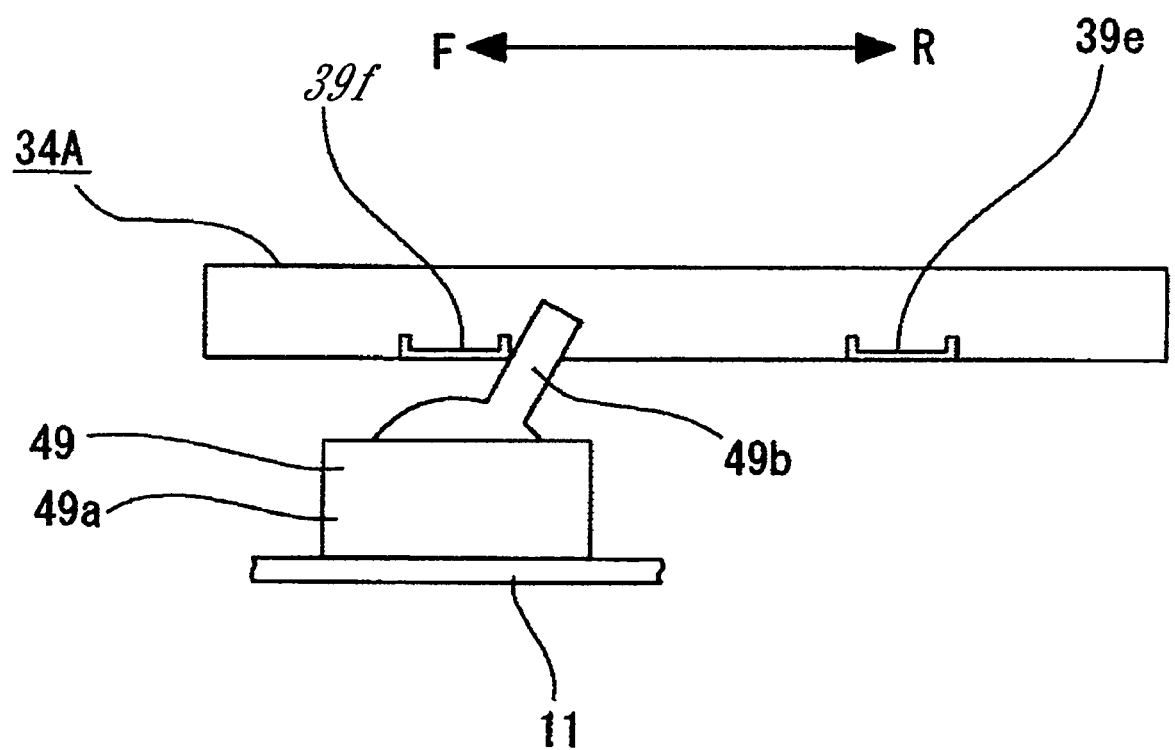
FIG. 33 is a general side view showing the condition where the changeover switch is being operated by an operating projected portion on the other side.

Incidentally, while an example in which the drive condition of the drive motor 18 is changed over by use of the two switches, namely, the changeover switches 12, 13 has been shown in the above description, there may also be adopted a system in which the drive condition of the drive motor 18 is changed over by use of only one changeover switch 49, for example, as shown in FIGS. 31 to 33. The changeover switch 49 is composed of a switch case 49a and an operated piece 49b, and is operated by turning the operated piece 49b relative to the switch case 49a. The operated piece 49b has a non-operation position where it is not being operated, as a neutral position, and has a first operation position where it is fell down to the front side, and a second operation position where it is fell down to the rear side; when an operation is released, the operated piece 49b is reset from the first operation position or the second operation position into the non-operation position.

Where the changeover switch 49 is used, a holder 34A is for example provided with two operating projected pieces 39f, 39e spaced from each other in the front-rear direction. In the condition where the operated piece 49b of the changeover switch 49 is operated by the operating projected piece 39e on the rear side and the drive motor 18 is stopped (see FIG. 31), when the holder 34A is moved in the R direction attendant on the insertion of the recording medium 100, the operation on the operated piece 49b of the changeover switch 49 by the operating projected piece 39e is released, and the rotation of the drive motor 18 is started, whereby the holder 34A holding the recording medium 100 is moved in the R' direction (see FIG. 32). Since the operation on the operated piece 49b of the changeover switch 49 is released, the operated piece 49b comes from the first operation position to the non-operation position.

When the holder 34A is moved in the R direction and the operated piece 49b is operated by the operating projected portion 39f on the front side, the rotation of the drive motor 18 is stopped, and the holder 34A reaches a completion position, whereby the loading operation is finished (see FIG. 33). Since the operated piece 49b of the changeover switch 49 is operated by the operating projected piece 39f, the operated piece 49b comes from the non-operation position to the second operation position.

In the condition where the holder 34A is in the completion position (see FIG. 33), when an ejection button is operated, the drive motor 18 is rotated in the direction reverse to the above, whereby the holder 34A is moved in the F direction (see FIG. 32). With the holder 34A moved in the F direction, the operation on the operated piece 49b of the changeover switch 49 by the operating projected piece 39f is released, and the operated piece 49b comes from the second operation position to the non-operation position.

When the holder 34A is moved in the F direction and the operated piece 49b is operated by the operating projected portion 39e on the rear side, the rotation of the drive motor 18 is stopped, and the holder 34A reaches the insertion/take-out position, whereby the ejecting operation is finished (see FIG. 31). Since the operated piece 49b of the changeover switch 49 is operated by the operating projected piece 39e, the operated piece 49b comes from the non-operation position to the first operation position.

By changing over the drive condition of the drive motor 18 by use of one changeover switch 49, as has been described above, it is possible to contrive a reduction in the manufacturing cost through a reduction in the number of component parts.

The shapes and structures of the components or parts shown in the above-described embodiment are each a mere example of embodiment in carrying out the present invention, and, therefore, the technical scope of the present invention should not be construed as limited by these examples.

As is clear from the above description, the loading apparatus for a recording medium having connection terminals according to the present invention includes: a holder which holds the recording medium having the connection terminals and which is moved between an insertion/take-out position where the recording medium is inserted or taken out and a completion position where the loading of the recording medium is completed; a chassis for supporting the holder movably between the insertion/take-out position and the completion position; terminal electrodes which are mounted to the holder and to which the connection terminals of the recording medium are connected; and a lock lever for locking the holder in the insertion/take-out position, wherein the locking of the holder in the insertion/take-out position by the lock lever is released when the connection terminals of the recording medium are connected to the terminal electrodes.

Therefore, the loading operation is started after the connection terminals are securely connected to the terminal electrodes, and it is possible to secure a good connection condition between the connection terminals of the recording medium and the terminal electrodes.

In addition, only the positional accuracy of the terminal electrodes relative to the holder and the positional accuracy of insertion of the recording medium in the holder influence the connection condition between the connection terminals and the terminal electrodes, and it is possible to secure a better connection condition between the connection terminals of the recording medium and the terminal electrodes, as compared with the case where the terminal electrodes are mounted to a member for supporting the holder movably.

Besides, in the present invention, the lock lever is provided with a restricting portion for restricting the movement of the holder from the insertion/take-out position, the lock lever is turnable between a lock position and an unlock position (lock release position) relative to the holder, a biasing spring for biasing the lock lever toward the lock position is provided, the chassis is provided with a restricted portion opposed to the restricting portion of the lock lever at the time of locking of the holder, and a predetermined gap is formed between the restricting portion of the lock lever and the restricted portion of the chassis in the insertion/take-out position. Therefore, the restricting portion does not make contact with the restricted portion of the chassis when the lock lever is turned, so that the load at the time of turning of the lock lever can be reduced, and the restricting portion and the restricted portion can be prevented from being scratched or worn.

In addition, in the present invention, there are provided a conveying rack which is movable relative to the holder in the same direction as the moving direction of the holder, a transmission gear meshed with a rack portion of the conveying rack, a drive motor for transmitting a drive force to the conveying rack through the transmission gear, and a limiter spring which connects the conveying rack and the holder to each other and which biases the holder to an insertion/take-out position. Therefore, the holder is moved relative to the conveying rack, and the rack portion and the transmission gear can be prevented from being broken or deformed.

Besides, in the present invention, the holder is integrally provided with a holding portion for holding the recording medium inserted in the holder, so that there is no need for a component part for exclusive use for holding the recording medium, it is possible to contrive a reduction in the number of component part, there is no need for a complicated holding mechanism, and it is possible to contrive simplification of mechanism.

In addition, in the present invention, the holder is formed of a metallic material, and an embossed form projected portion projected to the internal space side of the holder is formed as the holding portion, so that the processing of the holding portion is easy, the configuration is simple, and, therefore, it is possible to contrive a reduction in the manufacturing cost of the loading apparatus.

Besides, in the present invention, the holder is provided with an operating projected portion, and a changeover switch is provided which is operated by the operating projected portion and which changes over the drive condition of the drive motor, so that an enhancement of the reliability of operations can be contrived with a simple mechanism.

The invention claimed is:

1. A loading apparatus for a recording medium having connection terminals, comprising:
    a holder which holds said recording medium having said connection terminals and which is moved between an insertion/take-out position where said recording medium is inserted or taken out and a completion position where the loading of said recording medium is completed;
    a chassis for supporting said holder movably between said insertion/take-out position and said completion position;
    terminal electrodes which are mounted to said holder and to which said connection terminals of said recording medium are connected;
    a lock lever for locking said holder in said insertion/take-out position,
    wherein the locking of said holder in said insertion/take-out position by said lock lever is released when said connection terminals of said recording medium are connected to said terminal electrodes;
    said lock lever is provided with a restricting portion for restricting the movement of said holder from said insertion/take-out position, and said lock lever is turnable between a lock position and a lock release position relative to said holder;
    a bias spring is provided for biasing said lock lever toward said lock position;
    said chassis is provided with a restricted portion opposed to said restricting portion of said lock lever when said holder is locked; and
    a predetermined gap is formed between said restricting portion of said lock lever and said restricted portion of said chassis at said insertion/take-out position.

2. A loading apparatus for a recording medium having connection terminals as set forth in claim 1, comprising:
    a conveying rack having a rack portion movable relative to said holder in the same direction as the moving direction of said holder;
    a transmission gear meshed with said rack portion of said conveying rack;
    a drive motor for transmitting a drive force to said conveying rack through said transmission gear; and
    a limiter spring for connecting said conveying rack and said holder to each other and for biasing said holder toward said insertion/take-out position.

3. A loading apparatus for a recording medium having connection terminals as set forth in claim 1, wherein
    said holder is integrally provided with a holding portion for holding said recording medium inserted in said holder.

4. A loading apparatus for a recording medium having connection terminals as set forth in claim 3, wherein
    said holder is formed of a metallic material; and
    an embossed form projected portion projected to the internal space side of said holder is formed as said holding portion.

5. A loading apparatus for a recording medium having connection terminals as set forth in claim 1, wherein
    said holder is provided with an operating projected portion; and
    a changeover switch is provided which is operated by said operating projected portion so as to change over the driving condition of said drive motor.

6. A recording and/or reproduction apparatus comprising:
    a holder which holds a recording medium having connection terminals and which is moved between an insertion/take-out position where said recording medium is inserted or taken out and a completion position where the loading of said recording medium is completed;
    a chassis for supporting said holder movably between said insertion/take-out position and said completion position;
    terminal electrodes which are mounted to said holder and to which said connection terminals of said recording medium are connected;
    a lock lever for locking said holder in said insertion/take-out position and for releasing the lock of said holder in said insertion/take-out position by said lock lever when said connection terminals of said recording medium are connected to said terminal electrodes;

said lock lever is provided with a restricting portion for restricting the movement of said holder from said insertion/take-out position, and said lock lever is turnable between a lock position and a lock release position relative to said holder;

a bias spring is provided for biasing said lock lever toward said lock position;

said chassis is provided with a restricted portion opposed to said restricting portion of said lock lever when said holder is locked; and a predetermined gap is formed between said restricting portion of said lock lever and said restricted portion of said chassis at said insertion/take-out position; and recording and/or reproduction means for performing recording and/or reproduction of information on or from said recording medium at said completion position.

7. A loading apparatus for a recording medium having connection terminals, comprising:

a holder which holds said recording medium having said connection terminals and which is moved between an insertion/take-out position where said recording medium is inserted or taken out and a completion position where the loading of said recording medium is completed;

a chassis for supporting said holder movably between said insertion/take-out position and said completion position;

terminal electrodes which are mounted to said holder and to which said connection terminals of said recording medium are connected;

a lock lever for locking said holder in said insertion/take-out position;

a conveying rack having a rack portion movable relative to said holder in the same direction as the moving direction of said holder;

a transmission gear meshed with said rack portion of said conveying rack;

a drive motor for transmitting a drive force to said conveying rack through said transmission gear; and a limiter spring for connecting said conveying rack and said holder to each other and for biasing said holder toward said insertion/take-out position, wherein the locking of said holder in said insertion/take-out position by said lock lever is released when said connection terminals of said recording medium are connected to said terminal electrodes.

8. A loading apparatus for a recording medium having connection terminals, comprising:

a holder which holds said recording medium having said connection terminals and which is moved between an insertion/take-out position where said recording medium is inserted or taken out and a completion position where the loading of said recording medium is completed;

a chassis for supporting said holder movably between said insertion/take-out position and said completion position;

terminal electrodes which are mounted to said holder and to which said connection terminals of said recording medium are connected; and a lock lever for locking said holder in said insertion/take-out position, wherein the locking of said holder in said insertion/take-out position by said lock lever is released when said connection terminals of said recording medium are connected to said terminal electrodes, wherein said holder is integrally provided with a holding portion for holding said recording medium inserted in said holder, wherein said holder is formed of a metallic material, and wherein an embossed form projected portion projected to the internal space side of said holder is formed as said holding portion.

9. A loading apparatus for a recording medium having connection terminals, comprising:

a holder which holds said recording medium having said connection terminals and which is moved between an insertion/take-out position where said recording medium is inserted or taken out and a completion position where the loading of said recording medium is completed;

a chassis for supporting said holder movably between said insertion/take-out position and said completion position;

terminal electrodes which are mounted to said holder and to which said connection terminals of said recording medium are connected; and a lock lever for locking said holder in said insertion/take-out position, wherein the locking of said holder in said insertion/take-out position by said lock lever is released when said connection terminals of said recording medium are connected to said terminal electrodes;

wherein said holder is provided with an operating projected portion; and wherein a changeover switch is provided which is operated by said operating projected portion so as to change over the driving condition of said drive motor.

* * * * *